United States Patent
Merlos et al.

(10) Patent No.: US 12,470,736 B1
(45) Date of Patent: Nov. 11, 2025

(54) RANGE-BASED CHANNEL REMOVAL AND FRAME PACKING FOR COMPRESSING FEATURE TENSORS WITH VIDEO CODECS

(71) Applicant: InterDigital VC Holdings, Inc., Wilmington, DE (US)

(72) Inventors: Juan Merlos, Wellington, FL (US); Fabien Racape, San Francisco, CA (US); Hyomin Choi, Sunnyvale, CA (US); Syed Mateen Ul haq, Mountain View, CA (US)

(73) Assignee: InterDigital VC Holdings, Inc., Wilmington, DE (US)

( * ) Notice: Subject to any disclaimer, the term of this patent is extended or adjusted under 35 U.S.C. 154(b) by 0 days.

(21) Appl. No.: 18/760,837

(22) Filed: Jul. 1, 2024

(51) Int. Cl.
  *H04N 19/00* (2014.01)
  *H04N 19/102* (2014.01)
  *H04N 19/44* (2014.01)
  *H04N 19/70* (2014.01)

(52) U.S. Cl.
  CPC .......... *H04N 19/44* (2014.11); *H04N 19/102* (2014.11); *H04N 19/70* (2014.11)

(58) Field of Classification Search
  CPC ....... H04N 19/44; H04N 19/102; H04N 19/70
  See application file for complete search history.

(56) References Cited

U.S. PATENT DOCUMENTS

| | | | | |
|---|---|---|---|---|
| 5,487,086 | A * | 1/1996 | Bhaskar | G10L 19/0212 375/243 |
| 7,460,041 | B2 * | 12/2008 | Yang | H03M 7/4006 341/51 |
| 8,135,062 | B1 * | 3/2012 | Cote | H04N 19/198 375/240.03 |
| 9,826,241 | B2 * | 11/2017 | Shima | H04N 19/126 |
| 12,100,185 | B2 * | 9/2024 | Lin | G06T 9/002 |
| 12,192,263 | B2 * | 1/2025 | Li | G06N 3/092 |
| 12,212,901 | B2 * | 1/2025 | Kojima | H04N 9/87 |
| 12,225,196 | B2 * | 2/2025 | Xiao | H04N 19/149 |
| 12,231,674 | B2 * | 2/2025 | Burlina | H04N 19/52 |
| 12,266,160 | B2 * | 4/2025 | He | G06V 10/778 |
| 12,288,365 | B2 * | 4/2025 | Wilczynski | H04N 19/17 |
| 12,293,308 | B2 * | 5/2025 | Buyanovskiy | G06N 7/01 |
| 12,321,719 | B1 * | 6/2025 | Streit | G06N 3/0475 |
| 2007/0030180 | A1 * | 2/2007 | Yang | H04N 19/44 341/50 |
| 2009/0067493 | A1 * | 3/2009 | Jun | H04N 19/176 375/E7.076 |

(Continued)

*Primary Examiner* — Frank F Huang
(74) *Attorney, Agent, or Firm* — Condo Roccia Koptiw LLP

(57) ABSTRACT

Systems, methods, and instrumentalities are disclosed herein for range-based channel removal and frame packing for compressing feature tensors with video codecs. In examples, the encoder may determine whether a channel is active or inactive. The encoder may perform channel reduction based on the determination that the channel is inactive. A feature tensor may be encoded based on the reduced channel. In examples, the decoder may obtain a channel activation indication associated with a channel. Based on the channel activation indication associated with the channel, the decoder may determine whether the channel is active or inactive. A feature tensor may be decoded based on the determination of whether the channel is active or inactive.

20 Claims, 17 Drawing Sheets

(56) References Cited

U.S. PATENT DOCUMENTS

| | | | | |
|---|---|---|---|---|
| 2011/0279644 A1* | 11/2011 | Suh | .................. | H04N 21/23614 |
| | | | | 348/E13.001 |
| 2012/0257674 A1* | 10/2012 | Macq | .................. | H04N 19/109 |
| | | | | 375/E7.243 |
| 2013/0003828 A1* | 1/2013 | Cohen | .................... | H04N 19/61 |
| | | | | 375/240.12 |
| 2014/0016698 A1* | 1/2014 | Joshi | ...................... | H04N 19/14 |
| | | | | 375/240.12 |
| 2014/0226721 A1* | 8/2014 | Joshi | .................... | H04N 19/176 |
| | | | | 375/240.12 |
| 2014/0376633 A1* | 12/2014 | Zhang | .................. | H04N 19/597 |
| | | | | 375/240.16 |
| 2016/0219283 A1* | 7/2016 | Chen | .................... | H04N 19/105 |
| 2018/0176576 A1* | 6/2018 | Rippel | ..................... | G06N 3/08 |
| 2023/0040392 A1* | 2/2023 | Aoki | ................ | H04N 21/21805 |
| 2024/0236377 A1* | 7/2024 | Rosewarne | ............ | H04N 19/46 |
| 2024/0414348 A1* | 12/2024 | Misra | ..................... | H04N 19/70 |
| 2025/0142099 A1* | 5/2025 | Sauer | ..................... | H04N 19/85 |
| 2025/0150626 A1* | 5/2025 | Choi | ..................... | H04N 19/70 |
| 2025/0159177 A1* | 5/2025 | Ahn | ..................... | H04N 19/136 |

* cited by examiner

RANGE-BASED CHANNEL REMOVAL AND FRAME PACKING FOR COMPRESSING FEATURE TENSORS WITH VIDEO CODECS

BACKGROUND

Video coding systems may be used to compress digital video signals, e.g., to reduce the storage and/or transmission bandwidth needed for such signals. Video coding systems may include, for example, block-based, wavelet-based, and/or object-based systems.

SUMMARY

Systems, methods, and instrumentalities are disclosed herein for range-based channel removal and frame packing for compressing feature tensors with video codecs.

In examples, the encoder may determine whether a channel is active or inactive. The encoder may perform channel reduction based on the determination that the channel is inactive. A feature tensor may be encoded based on the reduced channel. The encoder may include a channel activation indication associated with the channel configured to indicate whether the channel is inactive in video data. In examples, the encoder may determine to change a channel activation status of at least one channel associated with the feature tensor. An indication to update a channel status may be included in video data. The indications to update the channel status and the channel activation may be sent in a supplemental enhancement information (SEI) message.

In examples, the encoder may determine a channel range associated with the channel. Based on the channel range of the channel being below a value, the encoder may determine that the channel (e.g., a first channel) is inactive. Based on the channel being determined as inactive, the encoder may perform at least one of: removing the channel, scaling down the channel, truncating the channel, or filling the channel with a mean value (e.g., associated with a picture). Based on the channel range of the channel being above a value, the encoder may determine that the channel (e.g., a second channel) is active. Based on the determination that the channel (e.g., second channel) is active, the channel may be repacked. The feature tensor may be decoded based on the repacked channel.

In examples, the decoder may obtain a channel activation indication associated with a channel. Based on the channel activation indication associated with the channel, the decoder may determine whether the channel is active or inactive. A feature tensor may be decoded based on the determination of whether the channel is active or inactive. In examples, the decoder may obtain an indication to update a channel activation status. The channel activation indication may be obtained based on the indication indicating to update the channel status. The indication to update the channel status and the channel activation indication may be obtained in a supplemental enhancement information (SEI) message.

Based on the determination that the channel is active, the channel may be unpacked. The feature tensor may be decoded based on the unpacked channel. Based on the determination that the channel is inactive, the channel may be padded with a mean value (e.g., associated with a picture). The feature tensor may be decoded based on the padded channel. In examples, the feature tensor may be associated with a plurality of channels that comprises the channel. The decoder may identify a plurality of active channels associated with the feature tensor, may identify at least one inactive channel associated with the feature tensor, may unpack the plurality of active channels, and may reconstruct the feature tensor based on the plurality of unpacked active channels and the at least one inactive channel.

These examples may be performed by a device with a processor. The device may be an encoder or a decoder. These examples may be performed by a computer program product which is stored on a non-transitory computer readable medium and includes program code instructions. These examples may be performed by a computer program comprising program code instructions.

Systems, methods, and instrumentalities described herein may involve a decoder. In some examples, the systems, methods, and instrumentalities described herein may involve an encoder. In some examples, the systems, methods, and instrumentalities described herein may involve a signal (e.g., from an encoder and/or received by a decoder). A computer-readable medium may include instructions for causing one or more processors to perform methods described herein. A computer program product may include instructions which, when the program is executed by one or more processors, may cause the one or more processors to carry out the methods described herein.

DETAILED DESCRIPTION

A more detailed understanding may be had from the following description, given by way of example in conjunction with the accompanying drawings.

Figure 1A:
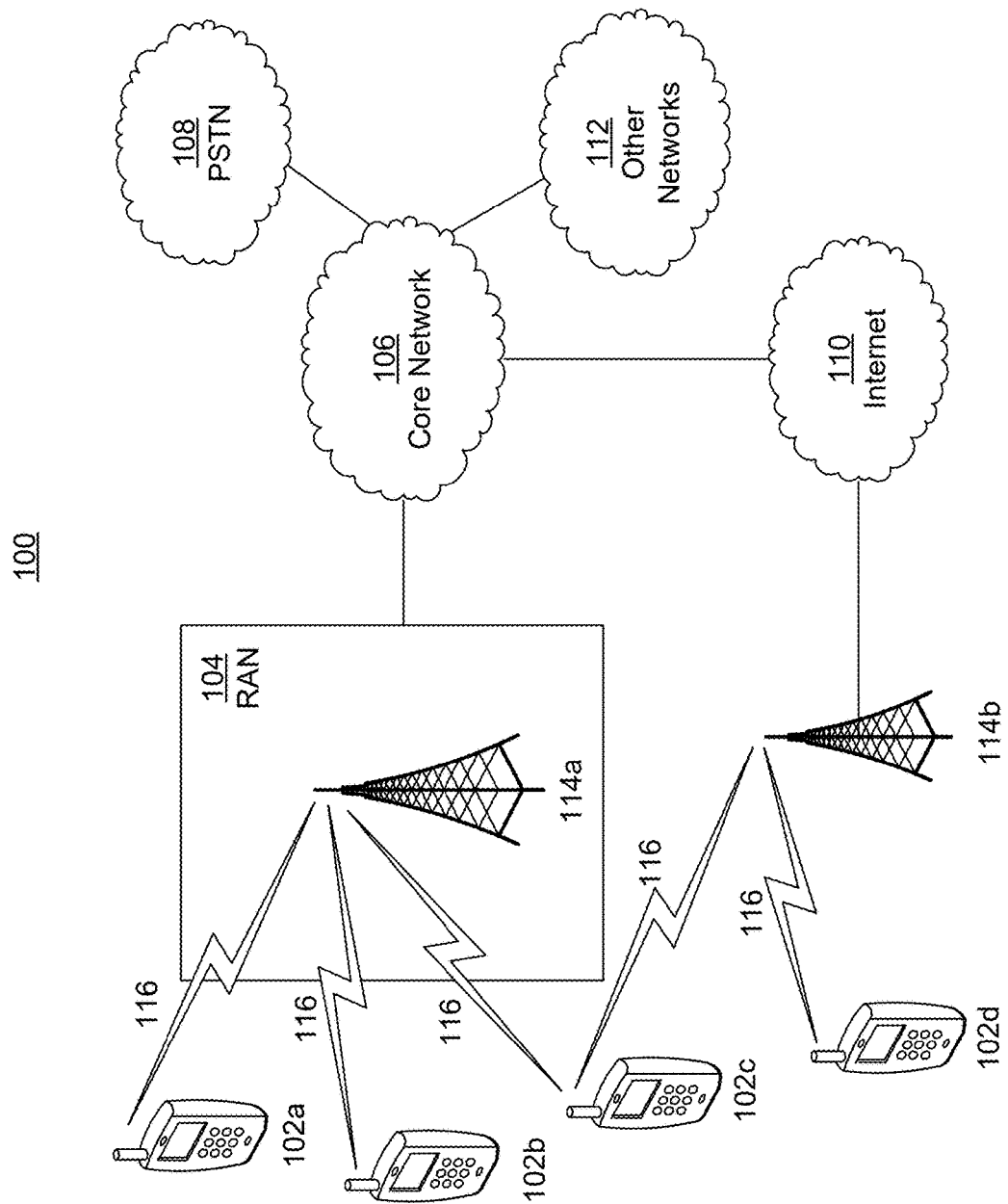
FIG. 1A is a system diagram illustrating an example communications system in which one or more disclosed embodiments may be implemented.

FIG. 1A is a diagram illustrating an example communications system 100 in which one or more disclosed embodiments may be implemented. The communications system 100 may be a multiple access system that provides content, such as voice, data, video, messaging, broadcast, etc., to multiple wireless users. The communications system 100 may enable multiple wireless users to access such content through the sharing of system resources, including wireless bandwidth. For example, the communications systems 100 may employ one or more channel access methods, such as code division multiple access (CDMA), time division multiple access (TDMA), frequency division multiple access (FDMA), orthogonal FDMA (OFDMA), single-carrier FDMA (SC-FDMA), zero-tail unique-word DFT-Spread OFDM (ZT UW DTS-s OFDM), unique word OFDM (UW-OFDM), resource block-filtered OFDM, filter bank multicarrier (FBMC), and the like.

As shown in FIG. 1A, the communications system 100 may include wireless transmit/receive units (WTRUs) 102a, 102b, 102c, 102d, a RAN 104/113, a CN 106/115, a public switched telephone network (PSTN) 108, the Internet 110, and other networks 112, though it will be appreciated that the disclosed embodiments contemplate any number of WTRUs, base stations, networks, and/or network elements. Each of the WTRUs 102a, 102b, 102c, 102d may be any type of device configured to operate and/or communicate in a wireless environment. By way of example, the WTRUs 102a, 102b, 102c, 102d, any of which may be referred to as a "station" and/or a "STA", may be configured to transmit and/or receive wireless signals and may include a user equipment (UE), a mobile station, a fixed or mobile subscriber unit, a subscription-based unit, a pager, a cellular telephone, a personal digital assistant (PDA), a smartphone, a laptop, a netbook, a personal computer, a wireless sensor, a hotspot or Mi-Fi device, an Internet of Things (IoT) device, a watch or other wearable, a head-mounted display (HMD), a vehicle, a drone, a medical device and applications (e.g., remote surgery), an industrial device and applications (e.g., a robot and/or other wireless devices operating in an industrial and/or an automated processing chain contexts), a consumer electronics device, a device operating on commercial and/or industrial wireless networks, and the like. Any of the WTRUs 102a, 102b, 102c and 102d may be interchangeably referred to as a UE.

The communications systems 100 may also include a base station 114a and/or a base station 114b. Each of the base stations 114a, 114b may be any type of device configured to wirelessly interface with at least one of the WTRUs 102a, 102b, 102c, 102d to facilitate access to one or more communication networks, such as the CN 106/115, the Internet 110, and/or the other networks 112. By way of example, the base stations 114a, 114b may be a base transceiver station (BTS), a Node-B, an eNode B, a Home Node B, a Home eNode B, a gNB, a NR NodeB, a site controller, an access point (AP), a wireless router, and the like. While the base stations 114a, 114b are each depicted as a single element, it will be appreciated that the base stations 114a, 114b may include any number of interconnected base stations and/or network elements.

The base station 114a may be part of the RAN 104/113, which may also include other base stations and/or network elements (not shown), such as a base station controller (BSC), a radio network controller (RNC), relay nodes, etc. The base station 114a and/or the base station 114b may be configured to transmit and/or receive wireless signals on one or more carrier frequencies, which may be referred to as a cell (not shown). These frequencies may be in licensed spectrum, unlicensed spectrum, or a combination of licensed and unlicensed spectrum. A cell may provide coverage for a wireless service to a specific geographical area that may be relatively fixed or that may change over time. The cell may further be divided into cell sectors. For example, the cell associated with the base station 114a may be divided into three sectors. Thus, in one embodiment, the base station 114a may include three transceivers, i.e., one for each sector of the cell. In an embodiment, the base station 114a may employ multiple-input multiple output (MIMO) technology and may utilize multiple transceivers for each sector of the cell. For example, beamforming may be used to transmit and/or receive signals in desired spatial directions.

The base stations 114a, 114b may communicate with one or more of the WTRUs 102a, 102b, 102c, 102d over an air interface 116, which may be any suitable wireless communication link (e.g., radio frequency (RF), microwave, centimeter wave, micrometer wave, infrared (IR), ultraviolet (UV), visible light, etc.). The air interface 116 may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114a in the RAN 104/113 and the WTRUs 102a, 102b, 102c may implement a radio technology such as Universal Mobile Telecommunications System (UMTS) Terrestrial Radio Access (UTRA), which may establish the air interface 116 using wideband CDMA (WCDMA). WCDMA may include communication protocols such as High-Speed Packet Access (HSPA) and/or Evolved HSPA (HSPA+). HSPA may include High-Speed Downlink (DL) Packet Access (HSDPA) and/or High-Speed UL Packet Access (HSUPA).

In an embodiment, the base station 114a and the WTRUs 102a, 102b, 102c may implement a radio technology such as Evolved UMTS Terrestrial Radio Access (E-UTRA), which may establish the air interface 116 using Long Term Evolution (LTE) and/or LTE-Advanced (LTE-A) and/or LTE-Advanced Pro (LTE-A Pro).

In an embodiment, the base station 114a and the WTRUs 102a, 102b, 102c may implement a radio technology such as NR Radio Access, which may establish the air interface 116 using New Radio (NR).

In an embodiment, the base station 114a and the WTRUs 102a, 102b, 102c may implement multiple radio access technologies. For example, the base station 114a and the WTRUs 102a, 102b, 102c may implement LTE radio access and NR radio access together, for instance using dual connectivity (DC) principles. Thus, the air interface utilized by WTRUs 102a, 102b, 102c may be characterized by multiple types of radio access technologies and/or transmissions sent to/from multiple types of base stations (e.g., a eNB and a gNB).

In other embodiments, the base station 114a and the WTRUs 102a, 102b, 102c may implement radio technologies such as IEEE 802.11 (i.e., Wireless Fidelity (WiFi), IEEE 802.16 (i.e., Worldwide Interoperability for Microwave Access (WiMAX)), CDMA2000, CDMA2000 1×, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114b in FIG. 1A may be a wireless router, Home Node B, Home eNode B, or access point, for example, and may utilize any suitable RAT for facilitating wireless connectivity in a localized area, such as a place of business, a home, a vehicle, a campus, an industrial facility, an air corridor (e.g., for use by drones), a roadway, and the like. In one embodiment, the base station 114b and the WTRUs 102c, 102d may implement a radio technology such as IEEE 802.11 to establish a wireless local area network (WLAN). In an embodiment, the base station 114b and the WTRUs 102c, 102d may implement a radio technology such as IEEE 802.15 to establish a wireless personal area network (WPAN). In yet another embodiment, the base station 114b and the WTRUs 102c, 102d may utilize a cellular-based RAT (e.g., WCDMA, CDMA2000, GSM, LTE, LTE-A, LTE-A Pro, NR etc.) to establish a picocell or femtocell. As shown in FIG. 1A, the base station 114b may have a direct connection to the Internet 110. Thus, the base station 114b may not be required to access the Internet 110 via the CN 106/115.

The RAN 104/113 may be in communication with the CN 106/115, which may be any type of network configured to provide voice, data, applications, and/or voice over internet protocol (VoIP) services to one or more of the WTRUs 102a, 102b, 102c, 102d. The data may have varying quality of service (QoS) requirements, such as differing throughput requirements, latency requirements, error tolerance requirements, reliability requirements, data throughput requirements, mobility requirements, and the like. The CN 106/115 may provide call control, billing services, mobile location-based services, pre-paid calling, Internet connectivity, video distribution, etc., and/or perform high-level security functions, such as user authentication. Although not shown in FIG. 1A, it will be appreciated that the RAN 104/113 and/or the CN 106/115 may be in direct or indirect communication with other RANs that employ the same RAT as the RAN 104/113 or a different RAT. For example, in addition to being connected to the RAN 104/113, which may be utilizing a NR radio technology, the CN 106/115 may also be in communication with another RAN (not shown) employing a GSM, UMTS, CDMA 2000, WiMAX, E-UTRA, or WiFi radio technology.

The CN 106/115 may also serve as a gateway for the WTRUs 102a, 102b, 102c, 102d to access the PSTN 108, the Internet 110, and/or the other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and/or the internet protocol (IP) in the TCP/IP internet protocol suite. The networks 112 may include wired and/or wireless communications networks owned and/or operated by other service providers. For example, the networks 112 may include another CN connected to one or more RANs, which may employ the same RAT as the RAN 104/113 or a different RAT.

Some or all of the WTRUs 102a, 102b, 102c, 102d in the communications system 100 may include multi-mode capabilities (e.g., the WTRUs 102a, 102b, 102c, 102d may include multiple transceivers for communicating with different wireless networks over different wireless links). For example, the WTRU 102c shown in FIG. 1A may be configured to communicate with the base station 114a, which may employ a cellular-based radio technology, and with the base station 114b, which may employ an IEEE 802 radio technology.

Figure 1B:
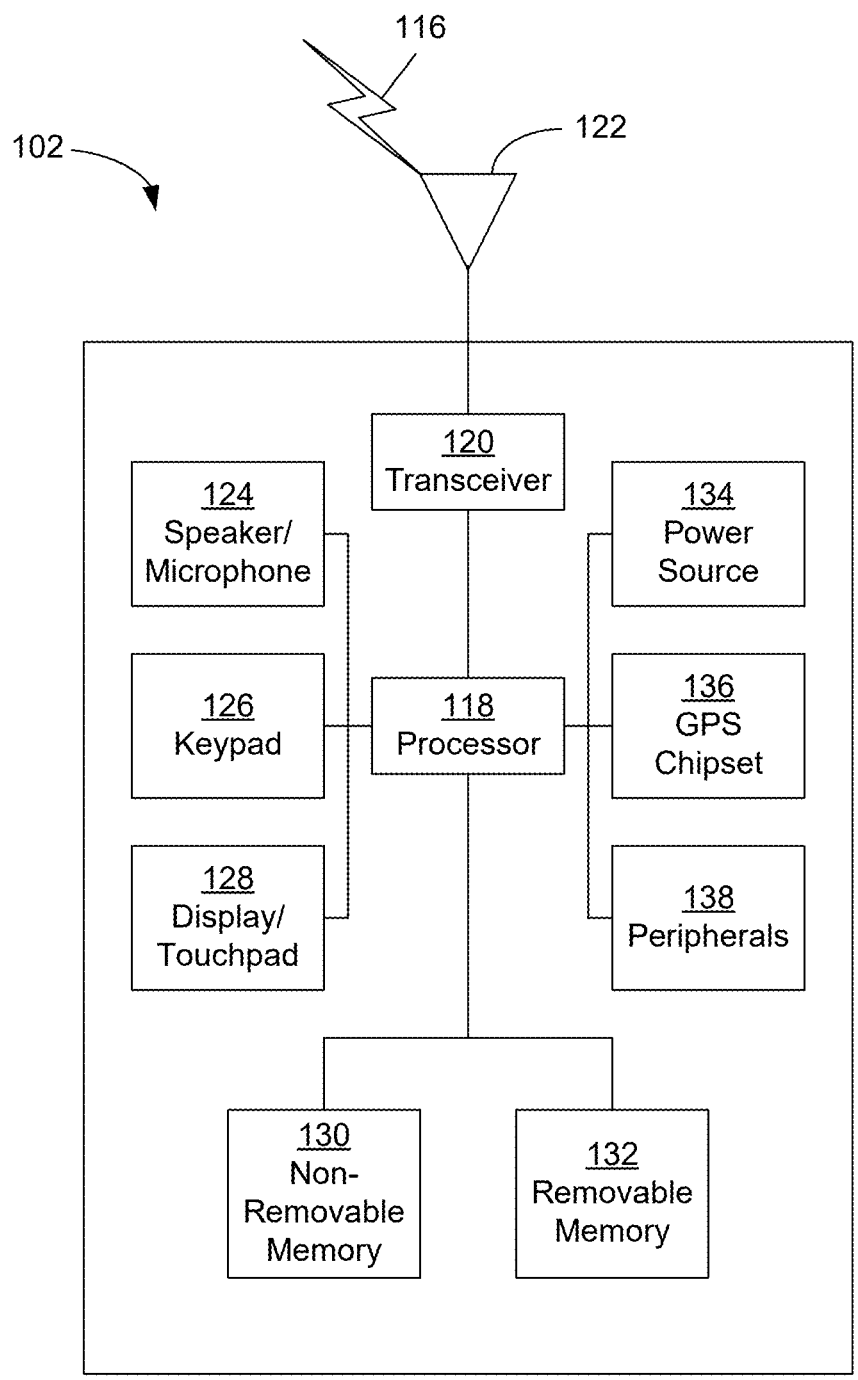
FIG. 1B is a system diagram illustrating an example wireless transmit/receive unit (WTRU) that may be used within the communications system illustrated in FIG. 1A according to an embodiment.

FIG. 1B is a system diagram illustrating an example WTRU 102. As shown in FIG. 1B, the WTRU 102 may include a processor 118, a transceiver 120, a transmit/receive element 122, a speaker/microphone 124, a keypad 126, a display/touchpad 128, non-removable memory 130, removable memory 132, a power source 134, a global positioning system (GPS) chipset 136, and/or other peripherals 138, among others. It will be appreciated that the WTRU 102 may include any sub-combination of the foregoing elements while remaining consistent with an embodiment.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), a state machine, and the like. As suggested above, the processor 118 may include a plurality of processors. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 1B depicts the processor 118 and the transceiver 120 as separate components, it will be appreciated that the processor 118 and the transceiver 120 may be integrated together in an electronic package or chip.

The transmit/receive element 122 may be configured to transmit signals to, or receive signals from, a base station (e.g., the base station 114a) over the air interface 116. For example, in one embodiment, the transmit/receive element 122 may be an antenna configured to transmit and/or receive RF signals. In an embodiment, the transmit/receive element 122 may be an emitter/detector configured to transmit and/or receive IR, UV, or visible light signals, for example. In yet another embodiment, the transmit/receive element 122 may be configured to transmit and/or receive both RF and light signals. It will be appreciated that the transmit/receive element 122 may be configured to transmit and/or receive any combination of wireless signals.

Although the transmit/receive element 122 is depicted in FIG. 1B as a single element, the WTRU 102 may include any number of transmit/receive elements 122. More specifically, the WTRU 102 may employ MIMO technology. Thus, in one embodiment, the WTRU 102 may include two or more transmit/receive elements 122 (e.g., multiple antennas) for transmitting and receiving wireless signals over the air interface 116.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as NR and IEEE 802.11, for example.

The processor 118 of the WTRU 102 may be coupled to, and may receive user input data from, the speaker/microphone 124, the keypad 126, and/or the display/touchpad 128 (e.g., a liquid crystal display (LCD) display unit or organic light-emitting diode (OLED) display unit). The processor 118 may also output user data to the speaker/microphone 124, the keypad 126, and/or the display/touchpad 128. In addition, the processor 118 may access information from, and store data in, any type of suitable memory, such as the non-removable memory 130 and/or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (SD) memory card, and the like. In other embodiments, the processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 116 from a base station (e.g., base stations 114a, 114b) and/or determine its location based on the timing of the signals being received from two or more nearby base stations. It will be appreciated that the WTRU 102 may acquire location information by way of any suitable location-determination method while remaining consistent with an embodiment.

The processor 118 may further be coupled to other peripherals 138, which may include one or more software and/or hardware modules that provide additional features, functionality and/or wired or wireless connectivity. For example, the peripherals 138 may include an accelerometer, an e-compass, a satellite transceiver, a digital camera (for photographs and/or video), a universal serial bus (USB) port, a vibration device, a television transceiver, a hands free headset, a Bluetooth® module, a frequency modulated (FM) radio unit, a digital music player, a media player, a video game player module, an Internet browser, a Virtual Reality and/or Augmented Reality (VR/AR) device, an activity tracker, and the like. The peripherals 138 may include one or more sensors, the sensors may be one or more of a gyroscope, an accelerometer, a hall effect sensor, a magnetometer, an orientation sensor, a proximity sensor, a temperature sensor, a time sensor; a geolocation sensor; an altimeter, a light sensor, a touch sensor, a magnetometer, a barometer, a gesture sensor, a biometric sensor, and/or a humidity sensor.

The WTRU 102 may include a full duplex radio for which transmission and reception of some or all of the signals (e.g., associated with particular subframes for both the UL (e.g., for transmission) and downlink (e.g., for reception) may be concurrent and/or simultaneous. The full duplex radio may include an interference management unit to reduce and or substantially eliminate self-interference via either hardware (e.g., a choke) or signal processing via a processor (e.g., a separate processor (not shown) or via processor 118). In an embodiment, the WRTU 102 may include a half-duplex radio for which transmission and reception of some or all of the signals (e.g., associated with particular subframes for either the UL (e.g., for transmission) or the downlink (e.g., for reception)).

Figure 1C:
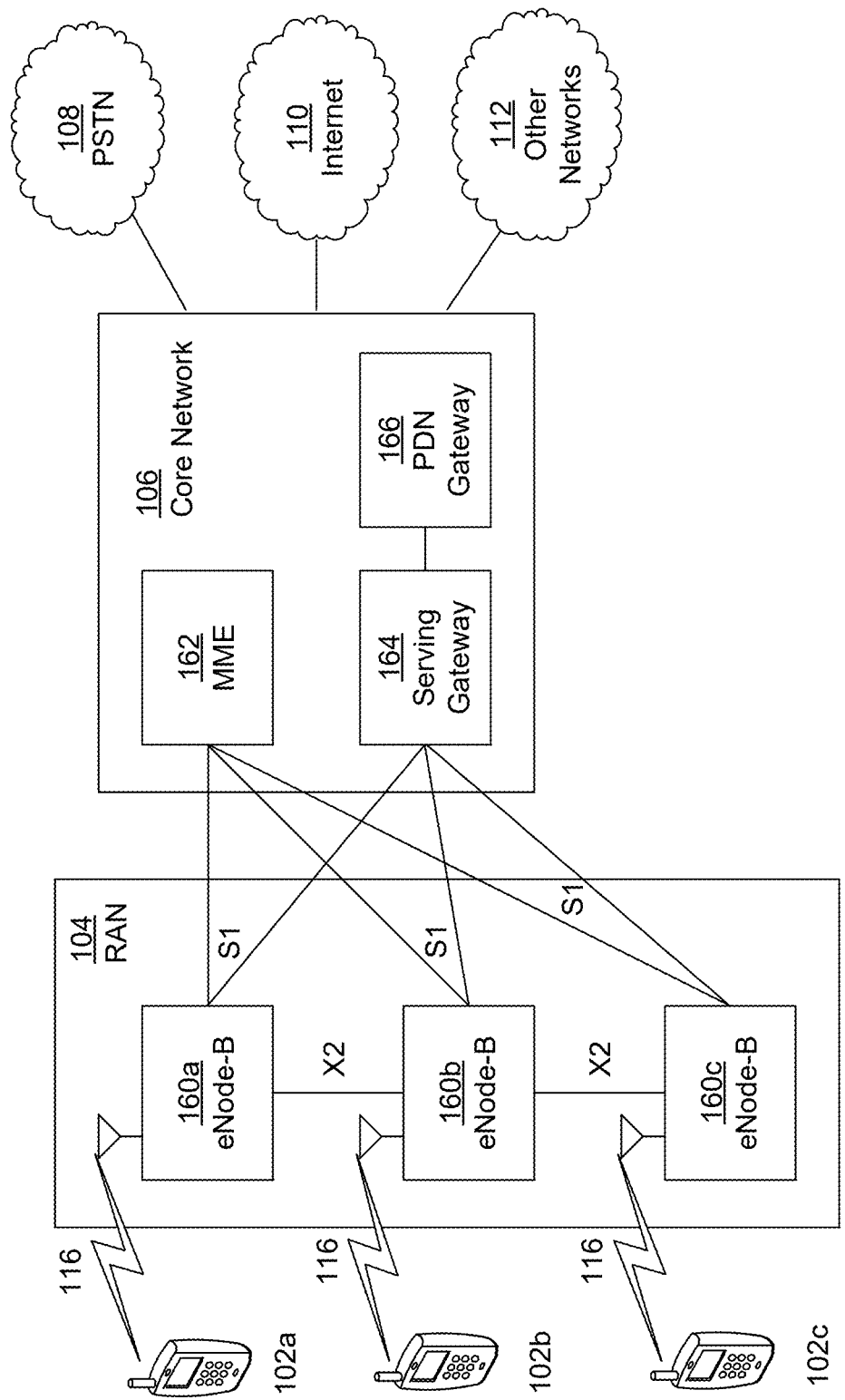
FIG. 1C is a system diagram illustrating an example radio access network (RAN) and an example core network (CN) that may be used within the communications system illustrated in FIG. 1A according to an embodiment.

FIG. 1C is a system diagram illustrating the RAN 104 and the CN 106 according to an embodiment. As noted above, the RAN 104 may employ an E-UTRA radio technology to communicate with the WTRUs 102a, 102b, 102c over the air interface 116. The RAN 104 may also be in communication with the CN 106.

The RAN 104 may include eNode-Bs 160a, 160b, 160c, though it will be appreciated that the RAN 104 may include any number of eNode-Bs while remaining consistent with an embodiment. The eNode-Bs 160a, 160b, 160c may each include one or more transceivers for communicating with the WTRUs 102a, 102b, 102c over the air interface 116. In one embodiment, the eNode-Bs 160a, 160b, 160c may implement MIMO technology. Thus, the eNode-B 160a, for example, may use multiple antennas to transmit wireless signals to, and/or receive wireless signals from, the WTRU 102a.

Each of the eNode-Bs 160a, 160b, 160c may be associated with a particular cell (not shown) and may be configured to handle radio resource management decisions, handover decisions, scheduling of users in the UL and/or DL, and the like. As shown in FIG. 1C, the eNode-Bs 160a, 160b, 160c may communicate with one another over an X2 interface.

The CN 106 shown in FIG. 1C may include a mobility management entity (MME) 162, a serving gateway (SGW) 164, and a packet data network (PDN) gateway (or PGW) 166. While each of the foregoing elements are depicted as part of the CN 106, it will be appreciated that any of these elements may be owned and/or operated by an entity other than the CN operator.

The MME 162 may be connected to each of the eNode-Bs 160a, 160b, 160c in the RAN 104 via an S1 interface and may serve as a control node. For example, the MME 162 may be responsible for authenticating users of the WTRUs 102a, 102b, 102c, bearer activation/deactivation, selecting a particular serving gateway during an initial attach of the WTRUs 102a, 102b, 102c, and the like. The MME 162 may provide a control plane function for switching between the RAN 104 and other RANs (not shown) that employ other radio technologies, such as GSM and/or WCDMA.

The SGW 164 may be connected to each of the eNode Bs 160a, 160b, 160c in the RAN 104 via the S1 interface. The SGW 164 may generally route and forward user data packets to/from the WTRUs 102a, 102b, 102c. The SGW 164 may perform other functions, such as anchoring user planes during inter-eNode B handovers, triggering paging when DL data is available for the WTRUs 102a, 102b, 102c, managing and storing contexts of the WTRUs 102a, 102b, 102c, and the like.

The SGW 164 may be connected to the PGW 166, which may provide the WTRUs 102a, 102b, 102c with access to packet-switched networks, such as the Internet 110, to facilitate communications between the WTRUs 102a, 102b, 102c and IP-enabled devices.

The CN 106 may facilitate communications with other networks. For example, the CN 106 may provide the WTRUs 102a, 102b, 102c with access to circuit-switched networks, such as the PSTN 108, to facilitate communications between the WTRUs 102a, 102b, 102c and traditional land-line communications devices. For example, the CN 106 may include, or may communicate with, an IP gateway (e.g., an IP multimedia subsystem (IMS) server) that serves as an interface between the CN 106 and the PSTN 108. In addition, the CN 106 may provide the WTRUs 102a, 102b, 102c with access to the other networks 112, which may include other wired and/or wireless networks that are owned and/or operated by other service providers.

Although the WTRU is described in FIGS. 1A-1D as a wireless terminal, it is contemplated that in certain representative embodiments that such a terminal may use (e.g., temporarily or permanently) wired communication interfaces with the communication network.

In representative embodiments, the other network 112 may be a WLAN.

A WLAN in Infrastructure Basic Service Set (BSS) mode may have an Access Point (AP) for the BSS and one or more stations (STAs) associated with the AP. The AP may have an access or an interface to a Distribution System (DS) or another type of wired/wireless network that carries traffic in to and/or out of the BSS. Traffic to STAs that originates from outside the BSS may arrive through the AP and may be delivered to the STAs. Traffic originating from STAs to destinations outside the BSS may be sent to the AP to be delivered to respective destinations. Traffic between STAs within the BSS may be sent through the AP, for example, where the source STA may send traffic to the AP and the AP may deliver the traffic to the destination STA. The traffic between STAs within a BSS may be considered and/or referred to as peer-to-peer traffic. The peer-to-peer traffic may be sent between (e.g., directly between) the source and destination STAs with a direct link setup (DLS). In certain representative embodiments, the DLS may use an 802.11e DLS or an 802.11z tunneled DLS (TDLS). A WLAN using an Independent BSS (IBSS) mode may not have an AP, and the STAs (e.g., all of the STAs) within or using the IBSS may communicate directly with each other. The IBSS mode of communication may sometimes be referred to herein as an "ad-hoc" mode of communication.

When using the 802.11ac infrastructure mode of operation or a similar mode of operations, the AP may transmit a beacon on a fixed channel, such as a primary channel. The primary channel may be a fixed width (e.g., 20 MHz wide bandwidth) or a dynamically set width via signaling. The primary channel may be the operating channel of the BSS and may be used by the STAs to establish a connection with the AP. In certain representative embodiments, Carrier Sense Multiple Access with Collision Avoidance (CSMA/CA) may be implemented, for example in in 802.11 systems. For CSMA/CA, the STAs (e.g., every STA), including the AP, may sense the primary channel. If the primary channel is sensed/detected and/or determined to be busy by a particular STA, the particular STA may back off. One STA (e.g., only one station) may transmit at any given time in a given BSS.

High Throughput (HT) STAs may use a 40 MHz wide channel for communication, for example, via a combination of the primary 20 MHz channel with an adjacent or nonadjacent 20 MHz channel to form a 40 MHz wide channel.

Very High Throughput (VHT) STAs may support 20 MHz, 40 MHz, 80 MHz, and/or 160 MHz wide channels. The 40 MHz, and/or 80 MHz, channels may be formed by combining contiguous 20 MHz channels. A 160 MHz channel may be formed by combining 8 contiguous 20 MHz channels, or by combining two non-contiguous 80 MHz channels, which may be referred to as an 80+80 configuration. For the 80+80 configuration, the data, after channel encoding, may be passed through a segment parser that may divide the data into two streams. Inverse Fast Fourier Transform (IFFT) processing, and time domain processing, may be done on each stream separately. The streams may be mapped on to the two 80 MHz channels, and the data may be transmitted by a transmitting STA. At the receiver of the receiving STA, the above described operation for the 80+80 configuration may be reversed, and the combined data may be sent to the Medium Access Control (MAC).

Sub 1 GHz modes of operation are supported by 802.11af and 802.11ah. The channel operating bandwidths, and carriers, are reduced in 802.11af and 802.11ah relative to those used in 802.11n, and 802.11ac. 802.11af supports 5 MHz, 10 MHz and 20 MHz bandwidths in the TV White Space (TVWS) spectrum, and 802.11ah supports 1 MHz, 2 MHz, 4 MHz, 8 MHz, and 16 MHz bandwidths using non-TVWS spectrum. According to a representative embodiment, 802.11ah may support Meter Type Control/Machine-Type Communications, such as MTC devices in a macro coverage area. MTC devices may have certain capabilities, for example, limited capabilities including support for (e.g., only support for) certain and/or limited bandwidths. The MTC devices may include a battery with a battery life above a threshold (e.g., to maintain a very long battery life).

WLAN systems, which may support multiple channels, and channel bandwidths, such as 802.11n, 802.11ac, 802.11af, and 802.11ah, include a channel which may be designated as the primary channel. The primary channel may have a bandwidth equal to the largest common operating bandwidth supported by all STAs in the BSS. The bandwidth of the primary channel may be set and/or limited by a STA, from among all STAs in operating in a BSS, which supports the smallest bandwidth operating mode. In the example of 802.11ah, the primary channel may be 1 MHz wide for STAs (e.g., MTC type devices) that support (e.g., only support) a 1 MHz mode, even if the AP, and other STAs in the BSS support 2 MHz, 4 MHz, 8 MHz, 16 MHz, and/or other channel bandwidth operating modes. Carrier sensing and/or Network Allocation Vector (NAV) settings may depend on the status of the primary channel. If the primary channel is busy, for example, due to a STA (which supports only a 1 MHz operating mode), transmitting to the AP, the entire available frequency bands may be considered busy even though a majority of the frequency bands remains idle and may be available.

In the United States, the available frequency bands, which may be used by 802.11ah, are from 902 MHz to 928 MHz. In Korea, the available frequency bands are from 917.5 MHz to 923.5 MHz. In Japan, the available frequency bands are from 916.5 MHz to 927.5 MHz. The total bandwidth available for 802.11ah is 6 MHz to 26 MHz depending on the country code.

Figure 1D:
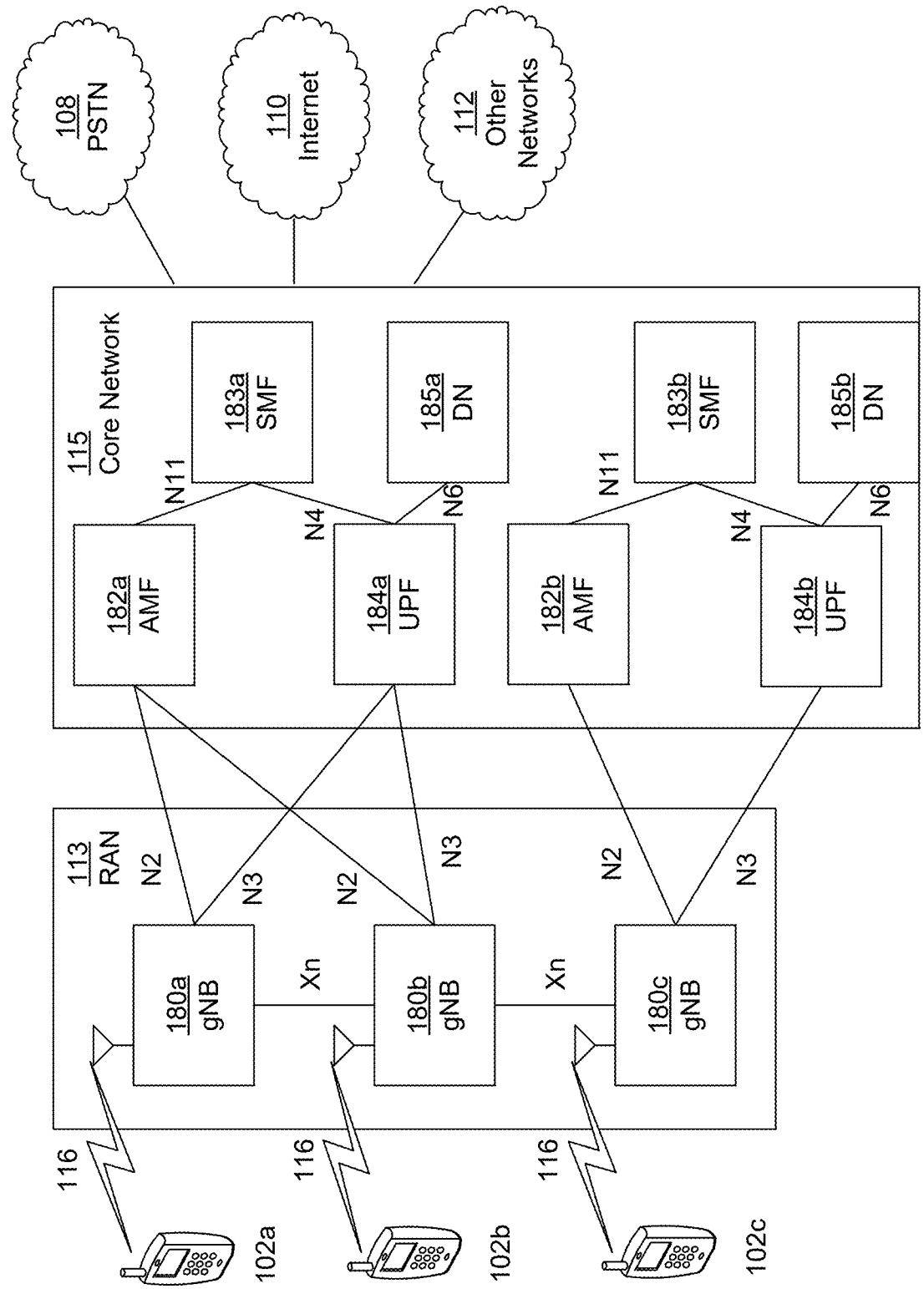
FIG. 1D is a system diagram illustrating a further example RAN and a further example CN that may be used within the communications system illustrated in FIG. 1A according to an embodiment.

FIG. 1D is a system diagram illustrating the RAN 113 and the CN 115 according to an embodiment. As noted above, the RAN 113 may employ an NR radio technology to communicate with the WTRUs 102a, 102b, 102c over the air interface 116. The RAN 113 may also be in communication with the CN 115.

The RAN 113 may include gNBs 180a, 180b, 180c, though it will be appreciated that the RAN 113 may include any number of gNBs while remaining consistent with an embodiment. The gNBs 180a, 180b, 180c may each include one or more transceivers for communicating with the WTRUs 102a, 102b, 102c over the air interface 116. In one embodiment, the gNBs 180a, 180b, 180c may implement MIMO technology. For example, gNBs 180a, 108b may utilize beamforming to transmit signals to and/or receive signals from the gNBs 180a, 180b, 180c. Thus, the gNB 180a, for example, may use multiple antennas to transmit wireless signals to, and/or receive wireless signals from, the WTRU 102a. In an embodiment, the gNBs 180a, 180b, 180c may implement carrier aggregation technology. For example, the gNB 180a may transmit multiple component carriers to the WTRU 102a (not shown). A subset of these component carriers may be on unlicensed spectrum while the remaining component carriers may be on licensed spectrum. In an embodiment, the gNBs 180a, 180b, 180c may implement Coordinated Multi-Point (CoMP) technology. For example, WTRU 102a may receive coordinated transmissions from gNB 180a and gNB 180b (and/or gNB 180c).

The WTRUs 102a, 102b, 102c may communicate with gNBs 180a, 180b, 180c using transmissions associated with a scalable numerology. For example, the OFDM symbol spacing and/or OFDM subcarrier spacing may vary for different transmissions, different cells, and/or different portions of the wireless transmission spectrum. The WTRUs 102a, 102b, 102c may communicate with gNBs 180a, 180b, 180c using subframe or transmission time intervals (TTIs) of various or scalable lengths (e.g., containing varying number of OFDM symbols and/or lasting varying lengths of absolute time).

The gNBs 180a, 180b, 180c may be configured to communicate with the WTRUs 102a, 102b, 102c in a standalone configuration and/or a non-standalone configuration. In the standalone configuration, WTRUs 102a, 102b, 102c may communicate with gNBs 180a, 180b, 180c without also accessing other RANs (e.g., such as eNode-Bs 160a, 160b, 160c). In the standalone configuration, WTRUs 102a, 102b, 102c may utilize one or more of gNBs 180a, 180b, 180c as a mobility anchor point. In the standalone configuration, WTRUs 102a, 102b, 102c may communicate with gNBs 180a, 180b, 180c using signals in an unlicensed band. In a non-standalone configuration WTRUs 102a, 102b, 102c may communicate with/connect to gNBs 180a, 180b, 180c while also communicating with/connecting to another RAN such as eNode-Bs 160a, 160b, 160c. For example, WTRUs 102a, 102b, 102c may implement DC principles to communicate with one or more gNBs 180a, 180b, 180c and one or more eNode-Bs 160a, 160b, 160c substantially simultaneously. In the non-standalone configuration, eNode-Bs 160a, 160b, 160c may serve as a mobility anchor for WTRUs 102a, 102b, 102c and gNBs 180a, 180b, 180c may provide additional coverage and/or throughput for servicing WTRUs 102a, 102b, 102c.

Each of the gNBs 180a, 180b, 180c may be associated with a particular cell (not shown) and may be configured to handle radio resource management decisions, handover decisions, scheduling of users in the UL and/or DL, support of network slicing, dual connectivity, interworking between NR and E-UTRA, routing of user plane data towards User Plane Function (UPF) 184a, 184b, routing of control plane information towards Access and Mobility Management Function (AMF) 182a, 182b and the like. As shown in FIG. 1D, the gNBs 180a, 180b, 180c may communicate with one another over an Xn interface.

The CN 115 shown in FIG. 1D may include at least one AMF 182a, 182b, at least one UPF 184a, 184b, at least one Session Management Function (SMF) 183a, 183b, and possibly a Data Network (DN) 185a, 185b. While each of the foregoing elements are depicted as part of the CN 115, it will be appreciated that any of these elements may be owned and/or operated by an entity other than the CN operator.

The AMF 182a, 182b may be connected to one or more of the gNBs 180a, 180b, 180c in the RAN 113 via an N2 interface and may serve as a control node. For example, the AMF 182a, 182b may be responsible for authenticating users of the WTRUs 102a, 102b, 102c, support for network slicing (e.g., handling of different PDU sessions with different requirements), selecting a particular SMF 183a, 183b, management of the registration area, termination of NAS signaling, mobility management, and the like. Network slicing may be used by the AMF 182a, 182b in order to customize CN support for WTRUs 102a, 102b, 102c based on the types of services being utilized WTRUs 102a, 102b, 102c. For example, different network slices may be established for different use cases such as services relying on ultra-reliable low latency (URLLC) access, services relying on enhanced massive mobile broadband (eMBB) access, services for machine type communication (MTC) access, and/or the like. The AMF 162 may provide a control plane function for switching between the RAN 113 and other RANs (not shown) that employ other radio technologies, such as LTE, LTE-A, LTE-A Pro, and/or non-3GPP access technologies such as WiFi.

The SMF 183a, 183b may be connected to an AMF 182a, 182b in the CN 115 via an N11 interface. The SMF 183a, 183b may also be connected to a UPF 184a, 184b in the CN 115 via an N4 interface. The SMF 183a, 183b may select and control the UPF 184a, 184b and configure the routing of traffic through the UPF 184a, 184b. The SMF 183a, 183b may perform other functions, such as managing and allocating UE IP address, managing PDU sessions, controlling policy enforcement and QoS, providing downlink data notifications, and the like. A PDU session type may be IP-based, non-IP based, Ethernet-based, and the like.

The UPF 184a, 184b may be connected to one or more of the gNBs 180a, 180b, 180c in the RAN 113 via an N3 interface, which may provide the WTRUs 102a, 102b, 102c with access to packet-switched networks, such as the Internet 110, to facilitate communications between the WTRUs 102a, 102b, 102c and IP-enabled devices. The UPF 184a, 184b may perform other functions, such as routing and forwarding packets, enforcing user plane policies, supporting multi-homed PDU sessions, handling user plane QoS, buffering downlink packets, providing mobility anchoring, and the like.

The CN 115 may facilitate communications with other networks. For example, the CN 115 may include, or may communicate with, an IP gateway (e.g., an IP multimedia subsystem (IMS) server) that serves as an interface between the CN 115 and the PSTN 108. In addition, the CN 115 may provide the WTRUs 102a, 102b, 102c with access to the other networks 112, which may include other wired and/or wireless networks that are owned and/or operated by other service providers. In one embodiment, the WTRUs 102a, 102b, 102c may be connected to a local Data Network (DN) 185a, 185b through the UPF 184a, 184b via the N3 interface to the UPF 184a, 184b and an N6 interface between the UPF 184a, 184b and the DN 185a, 185b.

In view of FIGS. 1A-1D, and the corresponding description of FIGS. 1A-1D, one or more, or all, of the functions described herein with regard to one or more of: WTRU 102a-d, Base Station 114a-b, eNode-B 160a-c, MME 162, SGW 164, PGW 166, gNB 180a-c, AMF 182a-b, UPF 184a-b, SMF 183a-b, DN 185a-b, and/or any other device(s) described herein, may be performed by one or more emulation devices (not shown). The emulation devices may be one or more devices configured to emulate one or more, or all, of the functions described herein. For example, the emulation devices may be used to test other devices and/or to simulate network and/or WTRU functions.

The emulation devices may be designed to implement one or more tests of other devices in a lab environment and/or in an operator network environment. For example, the one or more emulation devices may perform the one or more, or all, functions while being fully or partially implemented and/or deployed as part of a wired and/or wireless communication network in order to test other devices within the communication network. The one or more emulation devices may perform the one or more, or all, functions while being temporarily implemented/deployed as part of a wired and/or wireless communication network. The emulation device may be directly coupled to another device for purposes of testing and/or may performing testing using over-the-air wireless communications.

The one or more emulation devices may perform the one or more, including all, functions while not being implemented/deployed as part of a wired and/or wireless communication network. For example, the emulation devices may be utilized in a testing scenario in a testing laboratory and/or a non-deployed (e.g., testing) wired and/or wireless communication network in order to implement testing of one or more components. The one or more emulation devices may be test equipment. Direct RF coupling and/or wireless communications via RF circuitry (e.g., which may include one or more antennas) may be used by the emulation devices to transmit and/or receive data.

This application describes a variety of aspects, including tools, features, examples, models, approaches, etc. Many of these aspects are described with specificity and, at least to show the individual characteristics, are often described in a manner that may sound limiting. However, this is for purposes of clarity in description, and does not limit the application or scope of those aspects. Indeed, all of the different aspects may be combined and interchanged to provide further aspects. Moreover, the aspects may be combined and interchanged with aspects described in earlier filings as well.

The aspects described and contemplated in this application may be implemented in many different forms. FIGS. 5-14 described herein may provide some examples, but other examples are contemplated. The discussion of FIGS. 5-14 does not limit the breadth of the implementations. At least one of the aspects generally relates to video encoding and decoding, and at least one other aspect generally relates to transmitting a bitstream generated or encoded. These and other aspects may be implemented as a method, an apparatus, a computer readable storage medium having stored thereon instructions for encoding or decoding video data according to any of the methods described, and/or a computer readable storage medium having stored thereon a bitstream generated according to any of the methods described.

In the present application, the terms "reconstructed" and "decoded" may be used interchangeably, the terms "pixel" and "sample" may be used interchangeably, the terms "image," "picture" and "frame" may be used interchangeably.

Various methods are described herein, and each of the methods comprises one or more steps or actions for achieving the described method. Unless a specific order of steps or actions is required for proper operation of the method, the order and/or use of specific steps and/or actions may be modified or combined. Additionally, terms such as "first", "second", etc. may be used in various examples to modify an element, component, step, operation, etc., such as, for example, a "first decoding" and a "second decoding". Use of such terms does not imply an ordering to the modified operations unless specifically required. So, in this example, the first decoding need not be performed before the second decoding, and may occur, for example, before, during, or in an overlapping time period with the second decoding.

Figure 2:
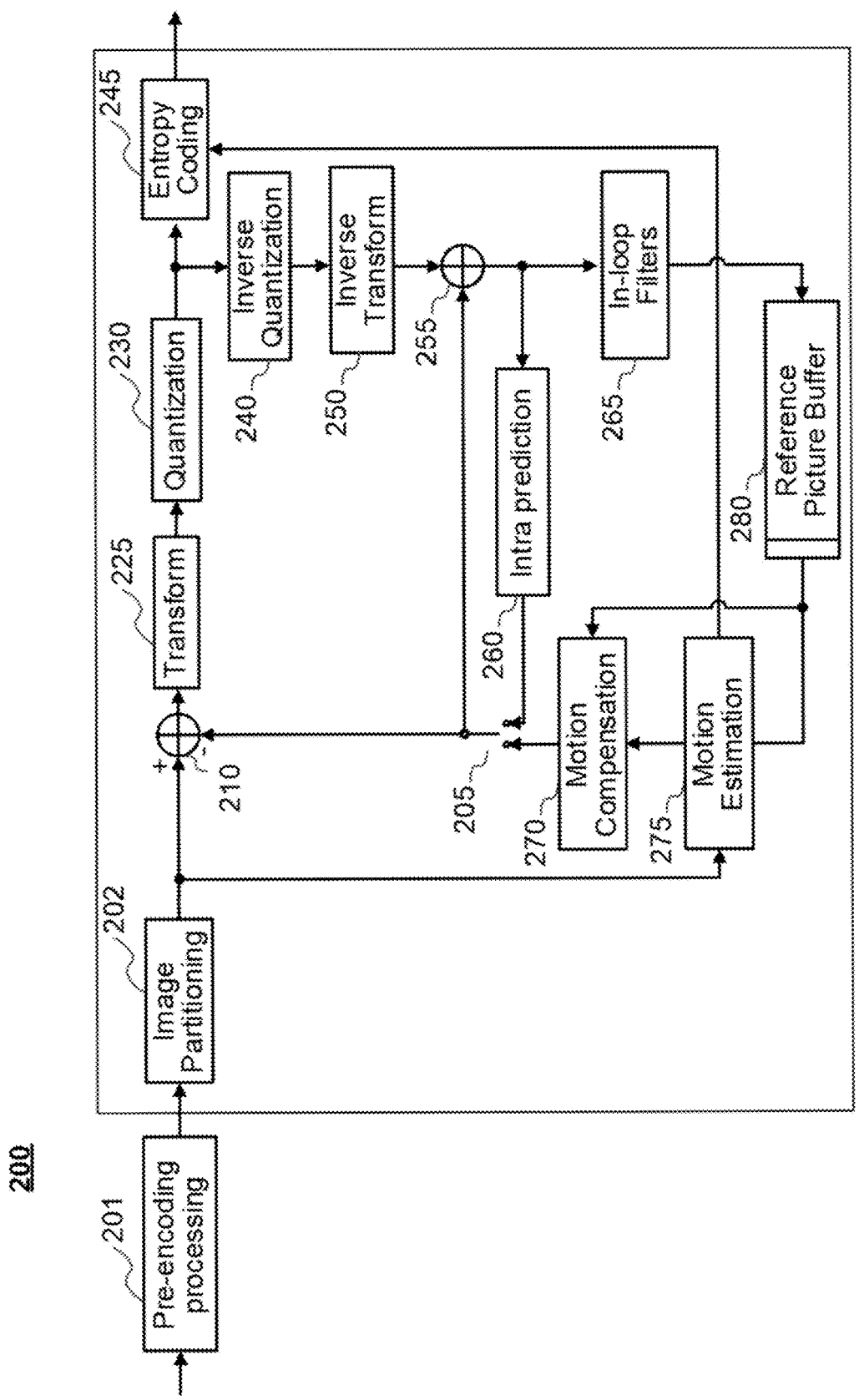
FIG. 2 illustrates an example video encoder.
Figure 3:
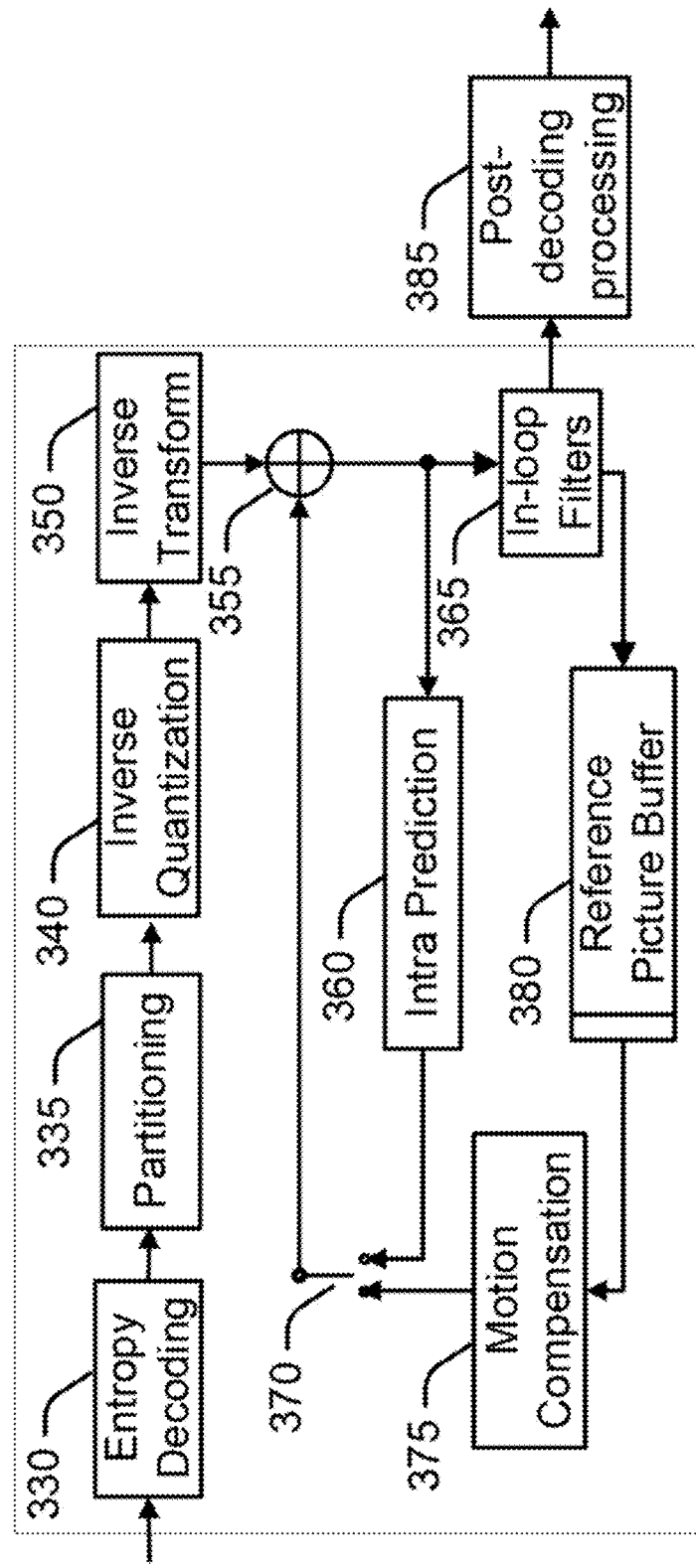
FIG. 3 illustrates an example video decoder.

Various methods and other aspects described in this application may be used to modify modules, for example, decoding modules, of a video encoder 200 and decoder 300 as shown in FIG. 2 and FIG. 3. Moreover, the subject matter disclosed herein may be applied, for example, to any type, format or version of video coding, whether described in a standard or a recommendation, whether pre-existing or future-developed, and extensions of any such standards and recommendations. Unless indicated otherwise, or technically precluded, the aspects described in this application may be used individually or in combination.

Various numeric values are used in examples described the present application, such as bits, bit depth, etc. These and other specific values are for purposes of describing examples and the aspects described are not limited to these specific values.

FIG. 2 is a diagram showing an example video encoder. Variations of example encoder 200 are contemplated, but the encoder 200 is described below for purposes of clarity without describing all expected variations.

Before being encoded, the video sequence may go through pre-encoding processing (201), for example, applying a color transform to the input color picture (e.g., conversion from RGB 4:4:4 to YCbCr 4:2:0), or performing a remapping of the input picture components in order to get a signal distribution more resilient to compression (for instance using a histogram equalization of one of the color components). Metadata may be associated with the pre-processing, and attached to the bitstream.

In the encoder 200, a picture is encoded by the encoder elements as described below. The picture to be encoded is partitioned (202) and processed in units of, for example, coding units (CUs). Each unit is encoded using, for example, either an intra or inter mode. When a unit is encoded in an intra mode, it performs intra prediction (260). In an inter mode, motion estimation (275) and compensation (270) are performed. The encoder decides (205) which one of the intra mode or inter mode to use for encoding the unit, and indicates the intra/inter decision by, for example, a prediction mode flag. Prediction residuals are calculated, for example, by subtracting (210) the predicted block from the original image block.

The prediction residuals are then transformed (225) and quantized (230). The quantized transform coefficients, as well as motion vectors and other syntax elements, are entropy coded (245) to output a bitstream. The encoder can skip the transform and apply quantization directly to the non-transformed residual signal. The encoder can bypass both transform and quantization, i.e., the residual is coded directly without the application of the transform or quantization processes.

The encoder decodes an encoded block to provide a reference for further predictions. The quantized transform coefficients are de-quantized (240) and inverse transformed (250) to decode prediction residuals. Combining (255) the decoded prediction residuals and the predicted block, an image block is reconstructed. In-loop filters (265) are applied to the reconstructed picture to perform, for example, deblocking/SAO (Sample Adaptive Offset) filtering to reduce encoding artifacts. The filtered image is stored at a reference picture buffer (280).

FIG. 3 is a diagram showing an example of a video decoder. In example decoder 300, a bitstream is decoded by the decoder elements as described below. Video decoder 300 generally performs a decoding pass reciprocal to the encoding pass as described in FIG. 2. The encoder 200 also generally performs video decoding as part of encoding video data.

In particular, the input of the decoder includes a video bitstream, which may be generated by video encoder 200. The bitstream is first entropy decoded (330) to obtain transform coefficients, motion vectors, and other coded information. The picture partition information indicates how the picture is partitioned. The decoder may therefore divide (335) the picture according to the decoded picture partitioning information. The transform coefficients are de-quantized (340) and inverse transformed (350) to decode the prediction residuals. Combining (355) the decoded prediction residuals and the predicted block, an image block is reconstructed. The predicted block may be obtained (370) from intra prediction (360) or motion-compensated prediction (i.e., inter prediction) (375). In-loop filters (365) are applied to the reconstructed image. The filtered image is stored at a reference picture buffer (380).

The decoded picture can further go through post-decoding processing (385), for example, an inverse color transform (e.g. conversion from YCbCr 4:2:0 to RGB 4:4:4) or an inverse remapping performing the inverse of the remapping process performed in the pre-encoding processing (201). The post-decoding processing can use metadata derived in the pre-encoding processing and signaled in the bitstream. In an example, the decoded images (e.g., after application of the in-loop filters (365) and/or after post-decoding processing (385), if post-decoding processing is used) may be sent to a display device for rendering to a user.

Figure 4:
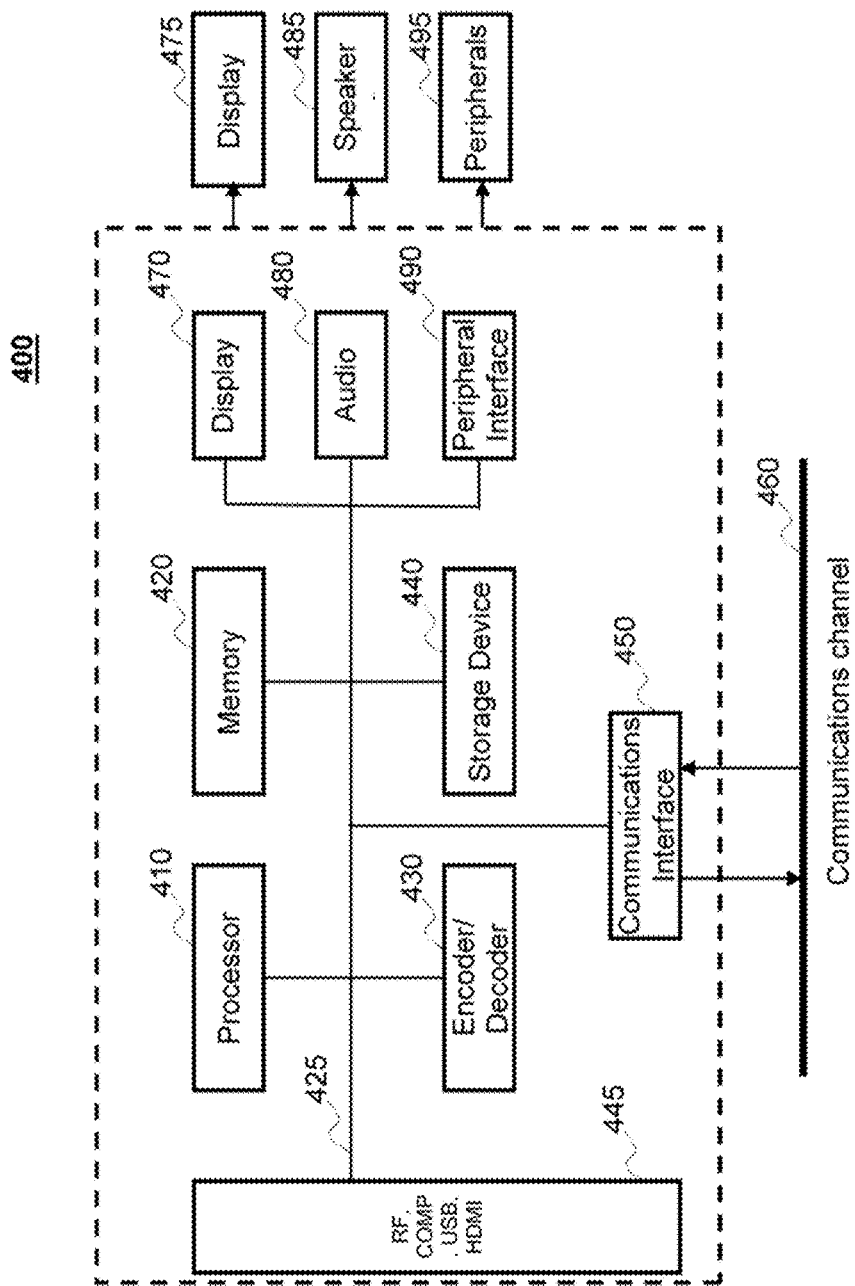
FIG. 4 illustrates an example of a system in which various aspects and examples may be implemented.

FIG. 4 is a diagram showing an example of a system in which various aspects and examples described herein may be implemented. System 400 may be embodied as a device including the various components described below and is configured to perform one or more of the aspects described in this document. Examples of such devices, include, but are not limited to, various electronic devices such as personal computers, laptop computers, smartphones, tablet computers, digital multimedia set top boxes, digital television receivers, personal video recording systems, connected home appliances, and servers. Elements of system 400, singly or in combination, may be embodied in a single integrated circuit (IC), multiple ICs, and/or discrete components. For example, in at least one example, the processing and encoder/decoder elements of system 400 are distributed across multiple ICs and/or discrete components. In various examples, the system 400 is communicatively coupled to one or more other systems, or other electronic devices, via, for example, a communications bus or through dedicated input and/or output ports. In various examples, the system 400 is configured to implement one or more of the aspects described in this document.

The system 400 includes at least one processor 410 configured to execute instructions loaded therein for implementing, for example, the various aspects described in this document. Processor 410 can include embedded memory, input output interface, and various other circuitries as known in the art. The system 400 includes at least one memory 420 (e.g., a volatile memory device, and/or a non-volatile memory device). System 400 includes a storage device 440, which can include non-volatile memory and/or volatile memory, including, but not limited to, Electrically Erasable Programmable Read-Only Memory (EEPROM), Read-Only Memory (ROM), Programmable Read-Only Memory (PROM), Random Access Memory (RAM), Dynamic Random Access Memory (DRAM), Static Random Access Memory (SRAM), flash, magnetic disk drive, and/or optical disk drive. The storage device 440 can include an internal storage device, an attached storage device (including detachable and non-detachable storage devices), and/or a network accessible storage device, as non-limiting examples.

System 400 includes an encoder/decoder module 430 configured, for example, to process data to provide an encoded video or decoded video, and the encoder/decoder module 430 can include its own processor and memory. The encoder/decoder module 430 represents module(s) that may be included in a device to perform the encoding and/or decoding functions. As is known, a device can include one or both of the encoding and decoding modules. Additionally, encoder/decoder module 430 may be implemented as a separate element of system 400 or may be incorporated within processor 410 as a combination of hardware and software as known to those skilled in the art.

Program code to be loaded onto processor 410 or encoder/decoder 430 to perform the various aspects described in this document may be stored in storage device 440 and subsequently loaded onto memory 420 for execution by processor 410. In accordance with various examples, one or more of processor 410, memory 420, storage device 440, and encoder/decoder module 430 can store one or more of various items during the performance of the processes described in this document. Such stored items can include, but are not limited to, the input video, the decoded video or portions of the decoded video, the bitstream, matrices, variables, and intermediate or final results from the processing of equations, formulas, operations, and operational logic.

In some examples, memory inside of the processor 410 and/or the encoder/decoder module 430 is used to store instructions and to provide working memory for processing that is needed during encoding or decoding. In other examples, however, a memory external to the processing device (for example, the processing device may be either the processor 410 or the encoder/decoder module 430) is used for one or more of these functions. The external memory may be the memory 420 and/or the storage device 440, for example, a dynamic volatile memory and/or a non-volatile flash memory. In several examples, an external non-volatile flash memory is used to store the operating system of, for example, a television. In at least one example, a fast external dynamic volatile memory such as a RAM is used as working memory for video encoding and decoding operations.

The input to the elements of system 400 may be provided through various input devices as indicated in block 445. Such input devices include, but are not limited to, (i) a radio frequency (RF) portion that receives an RF signal transmitted, for example, over the air by a broadcaster, (ii) a Component (COMP) input terminal (or a set of COMP input terminals), (iii) a Universal Serial Bus (USB) input terminal, and/or (iv) a High Definition Multimedia Interface (HDMI) input terminal. Other examples, not shown in FIG. 4, include composite video.

In various examples, the input devices of block 445 have associated respective input processing elements as known in the art. For example, the RF portion may be associated with elements suitable for (i) selecting a desired frequency (also referred to as selecting a signal, or band-limiting a signal to a band of frequencies), (ii) downconverting the selected signal, (iii) band-limiting again to a narrower band of frequencies to select (for example) a signal frequency band which may be referred to as a channel in certain examples, (iv) demodulating the downconverted and band-limited signal, (v) performing error correction, and/or (vi) demultiplexing to select the desired stream of data packets. The RF portion of various examples includes one or more elements to perform these functions, for example, frequency selectors, signal selectors, band-limiters, channel selectors, filters, downconverters, demodulators, error correctors, and demultiplexers. The RF portion can include a tuner that performs various of these functions, including, for example, downconverting the received signal to a lower frequency (for example, an intermediate frequency or a near-baseband frequency) or to baseband. In one set-top box example, the RF portion and its associated input processing element receives an RF signal transmitted over a wired (for example, cable) medium, and performs frequency selection by filtering, downconverting, and filtering again to a desired frequency band. Various examples rearrange the order of the above-described (and other) elements, remove some of these elements, and/or add other elements performing similar or different functions. Adding elements can include inserting elements in between existing elements, such as, for example, inserting amplifiers and an analog-to-digital converter. In various examples, the RF portion includes an antenna.

The USB and/or HDMI terminals can include respective interface processors for connecting system 400 to other electronic devices across USB and/or HDMI connections. It is to be understood that various aspects of input processing, for example, Reed-Solomon error correction, may be implemented, for example, within a separate input processing IC or within processor 410 as necessary. Similarly, aspects of USB or HDMI interface processing may be implemented within separate interface ICs or within processor 410 as necessary. The demodulated, error corrected, and demultiplexed stream is provided to various processing elements, including, for example, processor 410, and encoder/decoder 430 operating in combination with the memory and storage elements to process the datastream as necessary for presentation on an output device.

Various elements of system 400 may be provided within an integrated housing. Within the integrated housing, the various elements may be interconnected and transmit data therebetween using suitable connection arrangement 425, for example, an internal bus as known in the art, including the Inter-IC (I2C) bus, wiring, and printed circuit boards.

The system 400 includes communication interface 450 that enables communication with other devices via communication channel 460. The communication interface 450 can include, but is not limited to, a transceiver configured to transmit and to receive data over communication channel 460. The communication interface 450 can include, but is not limited to, a modem or network card and the communication channel 460 may be implemented, for example, within a wired and/or a wireless medium.

Data is streamed, or otherwise provided, to the system 400, in various examples, using a wireless network such as a Wi-Fi network, for example IEEE 802.11 (IEEE refers to the Institute of Electrical and Electronics Engineers). The Wi-Fi signal of these examples is received over the communications channel 460 and the communications interface 450 which are adapted for Wi-Fi communications. The communications channel 460 of these examples is typically connected to an access point or router that provides access to external networks including the Internet for allowing streaming applications and other over-the-top communications. Other examples provide streamed data to the system 400 using a set-top box that delivers the data over the HDMI connection of the input block 445. Still other examples provide streamed data to the system 400 using the RF connection of the input block 445. As indicated above, various examples provide data in a non-streaming manner. Additionally, various examples use wireless networks other than Wi-Fi, for example a cellular network or a Bluetooth® network.

The system 400 can provide an output signal to various output devices, including a display 475, speakers 485, and other peripheral devices 495. The display 475 of various examples includes one or more of, for example, a touchscreen display, an organic light-emitting diode (OLED) display, a curved display, and/or a foldable display. The display 475 may be for a television, a tablet, a laptop, a cell phone (mobile phone), or other device. The display 475 can also be integrated with other components (for example, as in a smart phone), or separate (for example, an external monitor for a laptop). The other peripheral devices 495 include, in various examples, one or more of a stand-alone digital video disc (or digital versatile disc) (DVD, for both terms), a disk player, a stereo system, and/or a lighting system. Various examples use one or more peripheral devices 495 that provide a function based on the output of the system 400. For example, a disk player performs the function of playing the output of the system 400.

In various examples, control signals are communicated between the system 400 and the display 475, speakers 485, or other peripheral devices 495 using signaling such as AV.Link, Consumer Electronics Control (CEC), or other communications protocols that enable device-to-device control with or without user intervention. The output devices may be communicatively coupled to system 400 via dedicated connections through respective interfaces 470, 480, and 490. Alternatively, the output devices may be connected to system 400 using the communications channel 460 via the communications interface 450. The display 475 and speakers 485 may be integrated in a single unit with the other components of system 400 in an electronic device such as, for example, a television. In various examples, the display interface 470 includes a display driver, such as, for example, a timing controller (T Con) chip.

The display 475 and speakers 485 can alternatively be separate from one or more of the other components, for example, if the RF portion of input 445 is part of a separate set-top box. In various examples in which the display 475 and speakers 485 are external components, the output signal may be provided via dedicated output connections, including, for example, HDMI ports, USB ports, or COMP outputs.

The examples may be carried out by computer software implemented by the processor 410 or by hardware, or by a combination of hardware and software. As a non-limiting example, the examples may be implemented by one or more integrated circuits. The memory 420 may be of any type appropriate to the technical environment and may be implemented using any appropriate data storage technology, such as optical memory devices, magnetic memory devices, semiconductor-based memory devices, fixed memory, and removable memory, as non-limiting examples. The processor 410 may be of any type appropriate to the technical environment, and can encompass one or more of microprocessors, general purpose computers, special purpose computers, and processors based on a multi-core architecture, as non-limiting examples.

Various implementations involve decoding. "Decoding", as used in this application, can encompass all or part of the processes performed, for example, on a received encoded sequence in order to produce a final output suitable for display. In various examples, such processes include one or more of the processes typically performed by a decoder, for example, entropy decoding, inverse quantization, inverse transformation, and differential decoding. In various examples, such processes also, or alternatively, may include processes performed by a decoder of various implementations described in this application, for example, obtaining a channel activation indication associated with a channel; based on the channel activation indication associated with the channel, determining whether the channel is active or inactive; decoding a feature tensor based on the determination of whether the channel is active or inactive; etc.

As further examples, in one example "decoding" refers only to entropy decoding, in another example "decoding" refers only to differential decoding, and in another example "decoding" refers to a combination of entropy decoding and differential decoding. Whether the phrase "decoding process" is intended to refer specifically to a subset of operations or generally to the broader decoding process will be clear based on the context of the specific descriptions and is believed to be well understood by those skilled in the art.

Various implementations involve encoding. In an analogous way to the above discussion about "decoding", "encoding" as used in this application can encompass all or part of the processes performed, for example, on an input video sequence in order to produce an encoded bitstream. In various examples, such processes include one or more of the processes typically performed by an encoder, for example, partitioning, differential encoding, transformation, quantization, and entropy encoding. In various examples, such processes also, or alternatively, may include processes performed by an encoder of various implementations described in this application, for example, determining whether a channel is active or inactive; performing channel reduction based on the determination that the channel is inactive; encoding a feature tensor based on the reduced channel; etc.

As further examples, in one example "encoding" refers only to entropy encoding, in another example "encoding" refers only to differential encoding, and in another example "encoding" refers to a combination of differential encoding and entropy encoding. Whether the phrase "encoding process" is intended to refer specifically to a subset of operations or generally to the broader encoding process will be clear based on the context of the specific descriptions and is believed to be well understood by those skilled in the art.

When a figure is presented as a flow diagram, it should be understood that it also provides a block diagram of a corresponding apparatus. Similarly, when a figure is presented as a block diagram, it should be understood that it also provides a flow diagram of a corresponding method/process.

The implementations and aspects described herein may be implemented in, for example, a method or a process, an apparatus, a software program, a data stream, or a signal. Even if only discussed in the context of a single form of implementation (for example, discussed only as a method), the implementation of features discussed can also be implemented in other forms (for example, an apparatus or program). An apparatus may be implemented in, for example, appropriate hardware, software, and firmware. The methods may be implemented in, for example, a processor, which refers to processing devices in general, including, for example, a computer, a microprocessor, an integrated circuit, or a programmable logic device. Processors also include communication devices, such as, for example, computers, cell phones, portable/personal digital assistants ("PDAs"), and other devices that facilitate communication of information between end-users.

Reference to "one example" or "an example" or "one implementation" or "an implementation", as well as other variations thereof, means that a particular feature, structure, characteristic, and so forth described in connection with the example is included in at least one example. Thus, the appearances of the phrase "in one example" or "in an example" or "in one implementation" or "in an implementation", as well any other variations, appearing in various places throughout this application are not necessarily all referring to the same example.

Additionally, this application may refer to "determining" various pieces of information. Determining the information can include one or more of, for example, estimating the information, calculating the information, predicting the information, or retrieving the information from memory. Obtaining may include receiving, retrieving, constructing, generating, and/or determining.

Further, this application may refer to "accessing" various pieces of information. Accessing the information can include one or more of, for example, receiving the information, retrieving the information (for example, from memory), storing the information, moving the information, copying the information, calculating the information, determining the information, predicting the information, or estimating the information.

Additionally, this application may refer to "receiving" various pieces of information. Receiving is, as with "accessing", intended to be a broad term. Receiving the information can include one or more of, for example, accessing the information, or retrieving the information (for example, from memory). Further, "receiving" is typically involved, in one way or another, during operations such as, for example, storing the information, processing the information, transmitting the information, moving the information, copying the information, erasing the information, calculating the information, determining the information, predicting the information, or estimating the information.

It is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended, as is clear to one of ordinary skill in this and related arts, for as many items as are listed.

Also, as used herein, the word "signal" refers to, among other things, indicating something to a corresponding decoder. Encoder signals may include, for example, an encoding function on an input for a block using a precision factor, etc. In this way, in an example the same parameter is used at both the encoder side and the decoder side. Thus, for example, an encoder can transmit (explicit signaling) a particular parameter to the decoder so that the decoder can use the same particular parameter. Conversely, if the decoder already has the particular parameter as well as others, then signaling may be used without transmitting (implicit signaling) to simply allow the decoder to know and select the particular parameter. By avoiding transmission of any actual functions, a bit savings is realized in various examples. It is to be appreciated that signaling may be accomplished in a variety of ways. For example, one or more syntax elements, flags, and so forth are used to signal information to a corresponding decoder in various examples. While the preceding relates to the verb form of the word "signal", the word "signal" may (e.g., may also) be used herein as a noun.

As will be evident to one of ordinary skill in the art, implementations may produce a variety of signals formatted to carry information that may be, for example, stored or transmitted. The information can include, for example, instructions for performing a method, or data produced by one of the described implementations. For example, a signal may be formatted to carry the bitstream of a described example. Such a signal may be formatted, for example, as an electromagnetic wave (for example, using a radio frequency portion of spectrum) or as a baseband signal. The formatting may include, for example, encoding a data stream and modulating a carrier with the encoded data stream. The information that the signal carries may be, for example, analog or digital information. The signal may be transmitted over a variety of different wired or wireless links, as is known. The signal may be stored on, or accessed or received from, a processor-readable medium.

Many examples are described herein. Features of examples may be provided alone or in any combination, across various claim categories and types. Further, examples may include one or more of the features, devices, or aspects described herein, alone or in any combination, across various claim categories and types. For example, features described herein may be implemented in a bitstream or signal that includes information generated as described herein. The information may allow a decoder to decode a bitstream, the encoder, bitstream, and/or decoder according to any of the embodiments described. For example, features described herein may be implemented by creating and/or transmitting and/or receiving and/or decoding a bitstream or signal. For example, features described herein may be implemented a method, process, apparatus, medium storing instructions, medium storing data, or signal. For example, features described herein may be implemented by a TV, set-top box, cell phone, tablet, or other electronic device that performs decoding. The TV, set-top box, cell phone, tablet, or other electronic device may display (e.g., using a monitor, screen, or other type of display) a resulting image (e.g., an image from residual reconstruction of the video bitstream). The TV, set-top box, cell phone, tablet, or other electronic device may receive a signal including an encoded image and perform decoding.

These examples may be performed by a device with at least one processor. The device may be an encoder or a decoder. These examples may be performed by a computer program product which is stored on a non-transitory computer readable medium and includes program code instructions. These examples may be performed by a computer program comprising program code instructions.

Examples are provided herein to enable the efficient compression for intermediate video data in the context of split-computing (e.g., which may also be referred to as split interference or split inferencing).

Figure 5:
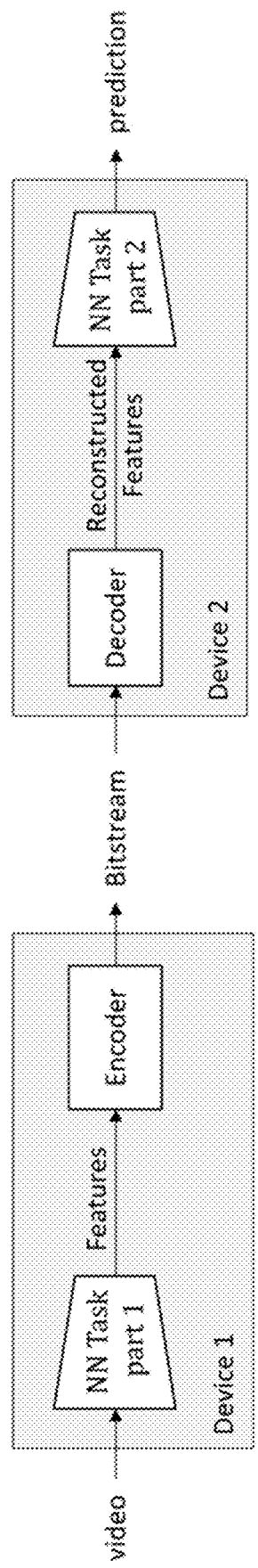
FIG. 5 illustrates an example of split computing in which the inference of a neural network (NN) may be shared between multiple devices (e.g., two remote devices).

FIG. 5 illustrates an example of split computing in which the inference of a neural network (NN) may be shared between multiple devices (e.g., two remote devices). As shown in FIG. 5, an output of a first part (e.g., NN task part 1) of a split NN on device 1 may include features extracted by the NN (e.g., which may be referred to herein as intermediate data at a split point) and/or may be transmitted to a Device 2 (e.g., a remote Device 2). In examples, the transmission may compress (e.g., may need to compress) the intermediate data by means of one or more features associated with video encoding (e.g., using a video encoding device and/or a video encoder). In examples, the transmission by compress the intermediate data by one or more features associated with any type of input (e.g., audio, text, medical imaging, etc.). Device 2 (e.g., including a video decoding device and/or a video decoder) may receive and decode the intermediate data. The decoded intermediate data may be outputted to a second part of the split NN (e.g., NN task part 2). In examples, device 1 may correspond to a battery-operated camera and device 2 may correspond to a remote cloud server. In examples, such splitting of the NN (e.g., a NN-based model) may be used to offload some of the computations if the device (e.g., the battery-operated camera) that captures and/or stores source contents (e.g., videos) is limited in terms of processing power, memory, and/or energy (e.g., battery power).

The examples provided herein may describe one split point (e.g., an NN being divided into two parts), but the techniques described in those examples may also be used to split an NN into more than two parts (e.g., with more than one split one) and/or among multiple (e.g., more than two) devices. In examples, adequate video data, such as bitstreams of intermediate data, may be created for one or more split points (e.g., at each split point).

When used herein, the term "video" may include image and/or video contents. Further, while video may be used as an example input to a neural network (e.g., NN task part 1 as shown in FIG. 5) in the examples provided herein, the neural network technology described herein may be used to process any type of input (e.g., audio, text, medical imaging, etc.).

Different techniques may be used to compress intermediate data (e.g., data at a split point of a neural network). These techniques may include, for example, transforming the intermediate data into an array (e.g., a two-dimensional (2D) array) and applying image and/or video coding/decoding techniques (e.g., signal prediction, transforms, quantization, re-sampling, entropy coding, etc.) to the array of data, for example, to reduce the size of a bitstream.

Figure 6:
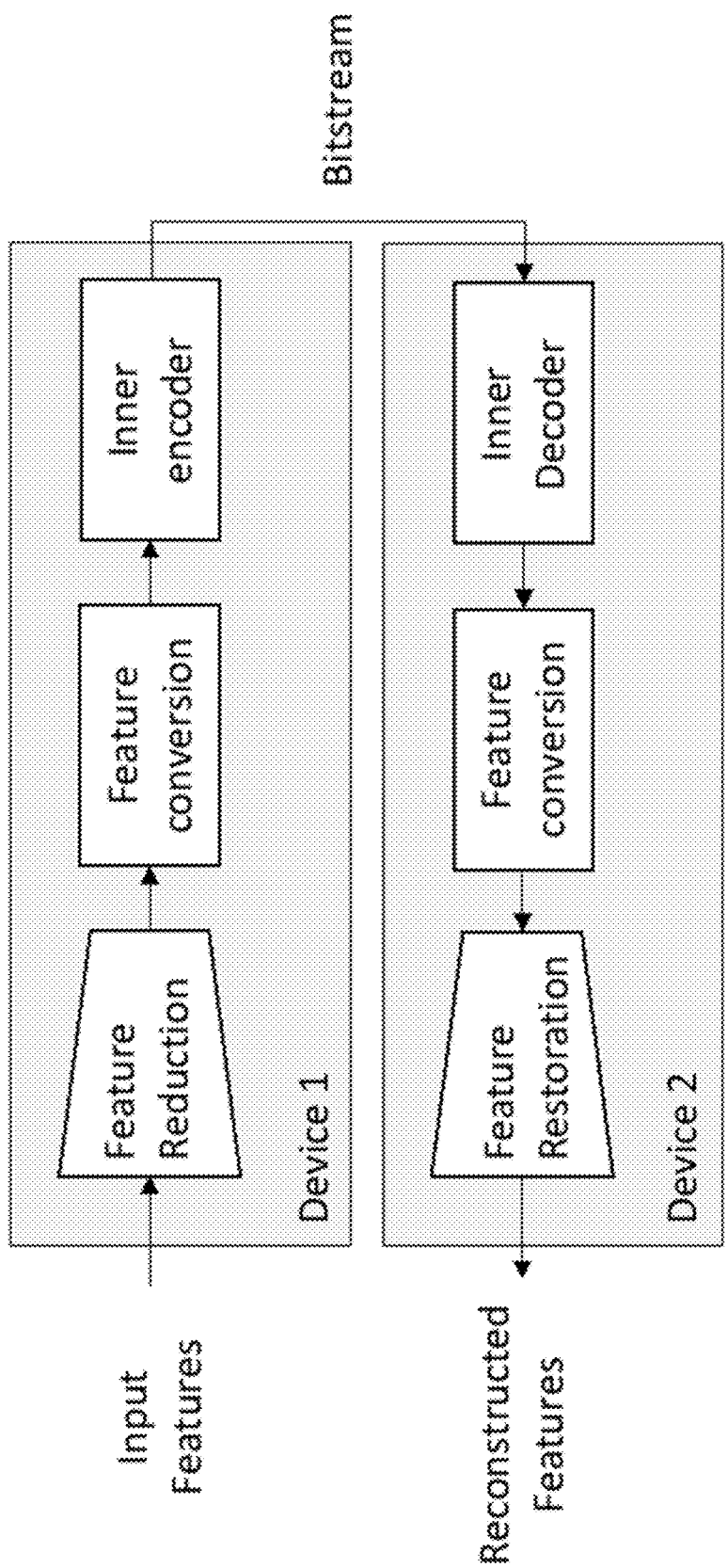
FIG. 6 illustrates an example of decomposing feature compression and/or decompression.

FIG. 6 illustrates an example of decomposing feature compression and/or decompression. As shown in FIG. 6, an encoder (e.g., device 1 in the figure) may perform one or more feature reduction operations that may transform potentially large tensors or lists of tensors into smaller ones, while keeping the relevant information. These operations may be performed, for example, using trained neural networks or low rank methods like Principal Component Analysis (PCA).

Figure 7:
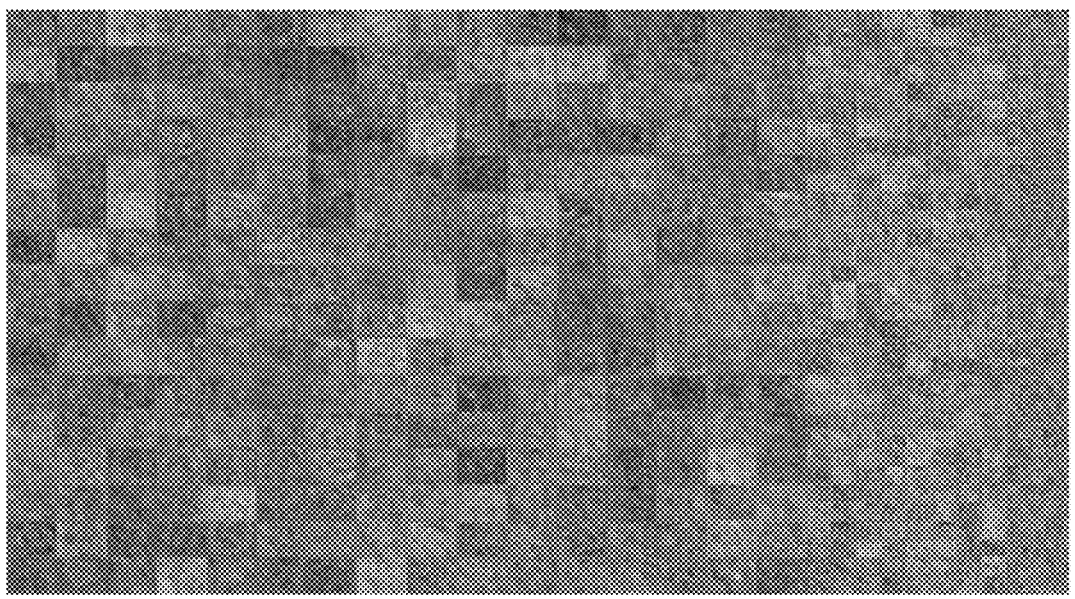
FIG. 7 illustrates an example of packed feature tensors onto a monochrome video frame.

FIG. 7 illustrates an example of packed feature tensors onto a monochrome video frame. In this example, features may include tensors of 256 channels at different resolutions (e.g., the tensors packed at the bottom have lower resolution channels). The reduced feature tensors may be converted into an image or video that may be fed to an image or video coder/decoder (e.g., codec), denoted as inner encoder and decoder in FIG. 6. In the case where intermediate data corresponds to a tensor of dimension H×W×C, where H, W, C may denote the height, width, and number of channels of the input data, respectively, the channels may be organized as the tiles of a large, packed frame. For instance, if C is a power of two, e.g., such as 64, the packed frame may correspond to a tiling of 8×8, resulting from a frame of size (8*W)×(8*H). This technique may be extended to tensors with any number of channels, for example, by padding the resulting packed frame. If the intermediate data (e.g., after reduction) corresponds to multiple tensors, the resulting packed frames for a (e.g., each) tensor may be packed again together (e.g., concatenated vertically as shown in FIG. 7) or processed independently. The resulting frame may be monochrome (e.g., in a YUV 4:0:0 format for at least some video codecs). The conversion process may include normalizing and/or quantizing the tensor values to be rescaled as unsigned integer values (e.g., in the range of bit-depth supported by the codec, such as, e.g., 8 or 10 bits).

The packed frame may be encoded, which may result in video data, such as a bitstream. The bitstream may include additional metadata that may specify parameters and/or settings for the reconstruction of the intermediate data (e.g., unpacking, rescaling to the original range of values, restoring the tensors to their original size and shape, etc.).

A decoder (e.g., device 2 of FIG. 6) may perform operations inverse to those of the encoder, as illustrated in FIG. 6. For example, the decoder may read a coded bitstream and the metadata included therein, and feed decoded frames to a feature conversion and restoration process. As part of the feature conversion, the decoder may perform inverse scaling and/or de-packing of one or more tensor channels, for example, based on scaling factors and/or geometric arrangement of the tensor channels within the packed frame. As part of the feature restoration, the decoder may take reduced tensors and transform them back to feature tensor or list of tensors of an original size. The feature conversion and/or restoration process may utilize (e.g., benefit from) metadata transmitted within the bitstream to parametrize the process, for example, with respect to an encoder side reduction process that may have been applied for a specific split task model or for specific contents. For instance, the feature restoration process may include learned operations, such as, e.g., learning the layer parameters (e.g., weights) of the neural network that may be specific to the content being coded. The feature restoration process may (e.g., may also) correspond to extracted data such as the mean values of the tensors or channels of tensors as well as one or more basis vectors (e.g., in the case of PCA-based feature reduction).

Figure 8:
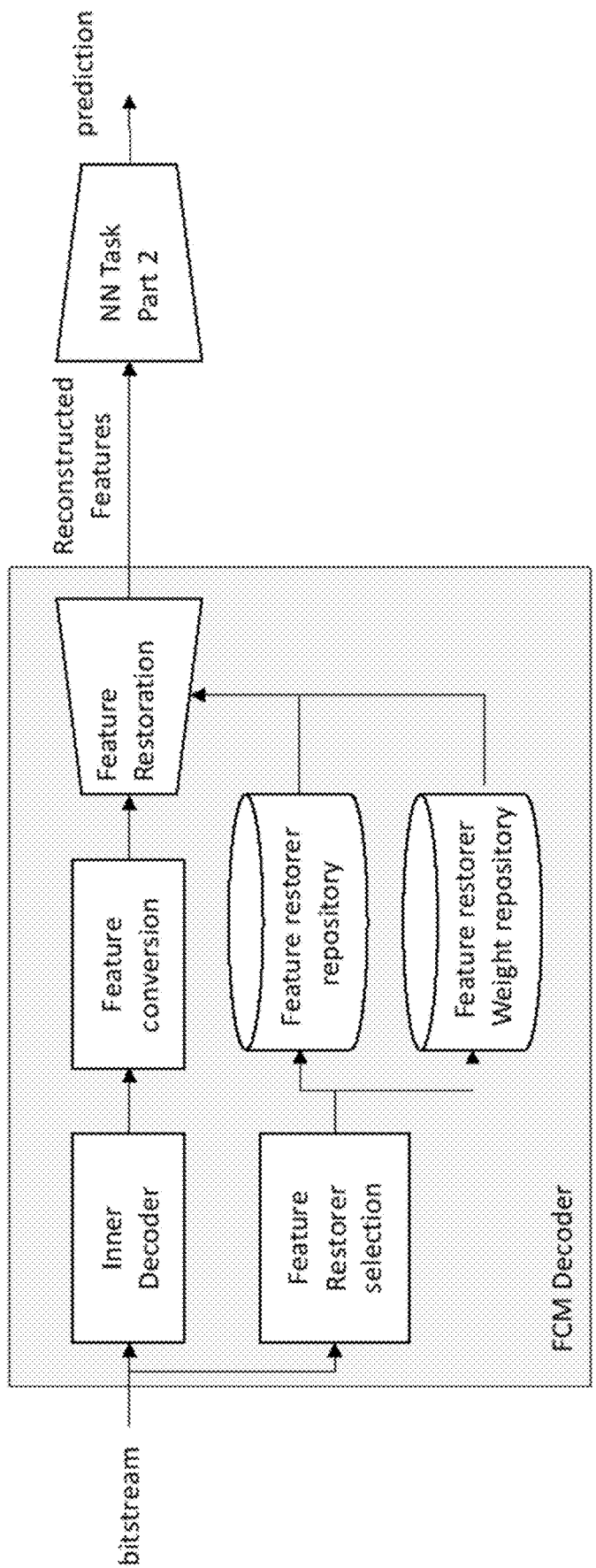
FIG. 8 illustrates an example of a feature coding for machine (FCM) decoder.

FIG. 8 illustrates an example of a feature coding for machine (FCM) decoder. The structure of an FCM decoder may be built on top of existing codecs, for example, as illustrated in FIG. 8. The bitstream shown in FIG. 8 may be a video data, such as video bitstream (e.g., to be decoded), that may include one or more packed tensors, augmented with syntax indicating necessary elements to select from an available feature restorer architecture, and/or corresponding sets of weights. Multiple sets of weights may be defined for the same architecture (e.g., when multiple task models share a similar architecture). A model may be trained toward different tasks. A feature restoration process may take (e.g., as input) converted features and parametrize the features (e.g., using restorer parameters) to reconstruct one or more decoder output feature tensors. The decoded tensors may be (e.g., after decoding) used as input to derive an inference (e.g., the inference of NN Task part 2 as shown in FIG. 5).

Examples associated with Feature Compression (FCM) may include Neural-Network (NN)-based reduction and feature restoration modules. The NN-based reduction and feature restoration modules may be trained to create compact features that can be mapped onto 2D frames to be fed to an inner codec. The inner codec may correspond to a standalone video or image compression already defining a self-contained bitstream. In some examples, performances of inner codecs may depend on the capacity of the feature reduction approach. However, in other examples, performances of inner codecs may not depend on the capacity of the feature reduction approach as the feature reduction approach may lack some flexibility. The feature reduction approach may lack flexibility in producing feature tensors of the same size (e.g., regardless of what the target operation point (e.g., bitrate/task accuracy) is and regardless of what the input content is). For example, the same model structure may be used regardless of what the target bitrate point is. The output number of channels may be fixed. The fixed pretrained reductor may produce features which may include channels that are not relevant to the end accuracy.

Examples of repacking the reduced tensor are provided herein. The reduced tensor may be repacked based on channel importance as determined by the dynamic range of the feature channels. This may truncate feature channels that may not include the necessary activation strength to meaningfully contribute to positive task network prediction but may include an inherent noise that can consume bits and/or negatively impact the task network prediction.

In some examples, the channel reduction approach may use a learned approach. The learned approach may involve processing network split point feature maps with a pretrained reduction neural network. The output may be a subset of feature maps, postprocessed and encoded. A reconstruction network may be used by the decoder to return the reduced feature maps to their original state, which may make the feature maps compatible with the task network (e.g., as shown in FIG. 5).

Figure 9:
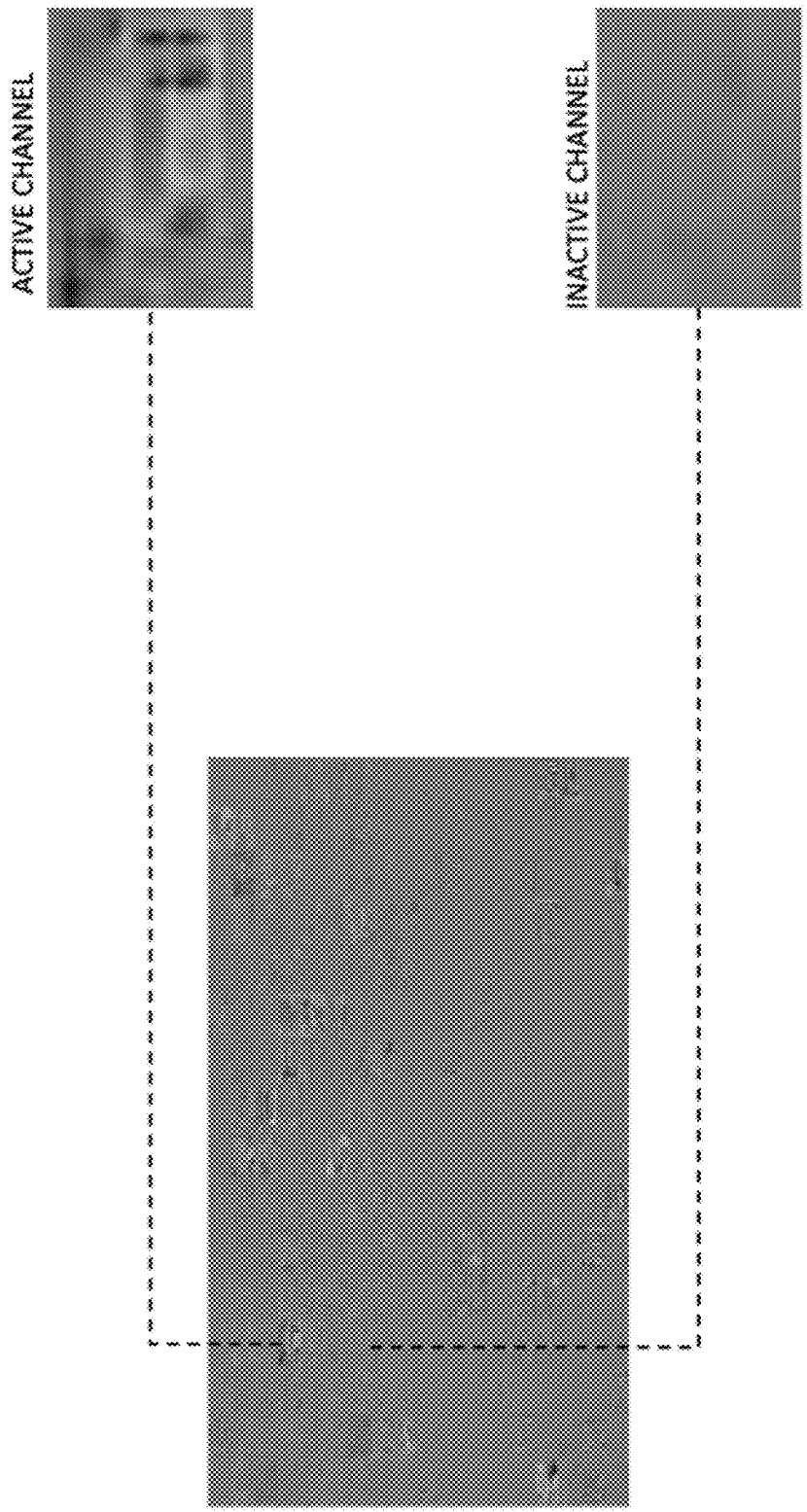
FIG. 9 illustrates an example of the distinction between an essential, active channel, and a noisy, inactive channel produced by the encoder-side reduction network.

FIG. 9 illustrates an example of the distinction between an essential, active channel and a noisy, inactive channel produced by the encoder-side reduction network. Reduced feature maps generated by the reduction network may exhibit a non-uniform distribution of activations across channels. Certain channels may include crucial, task-related information, whereas others may remain inactive. The presence of these inactive channels within the reduction methodology may result in inefficient utilization of bits by the encoder.

Examples herein relate to range-based inactive channel reduction. Range-based inactive channel reduction may (e.g., may further) reduce feature map count and/or pixel information on top of the feature reduction output by reducing inactive channels being sent to the inner encoder. Active feature channels may maintain more pronounced activations that can be measured by the dynamic range. A more active channel may have a bigger difference between its minimum value and maximum value than an inactive channel. This higher activation may have more of an impact on the task performance, which may correlate to positive task performance (e.g., in a properly trained network). Therefore, range-based inactive channel reduction may reduce channels deemed to have a low impact on task performance. In examples, the channel may be a channel associated with a feature map.

Range-based inactive channel reduction may reduce bitrate and may (e.g., may also) increase task performance. Inactive channels may include noise that is not relevant to the task network (e.g., especially when channels originate from a learned reduction network). In examples, the inactive channels may be reduced via averaging or truncation. If truncation is used, remaining active channels may be repacked into a smaller dimension 2D frame. This may save memory and energy in the encoding and decoding processes. In examples, inactive channels may be removed via other channel reduction processes. Examples of channel reduction processes may be removing the channel, scaling down the channel, filling the channel with a mean value (e.g., associated with the picture), scaling, blurring, quantizing, and/or any process that may be used to reduce the bitrate and/or impact on the task network.

Figure 10:
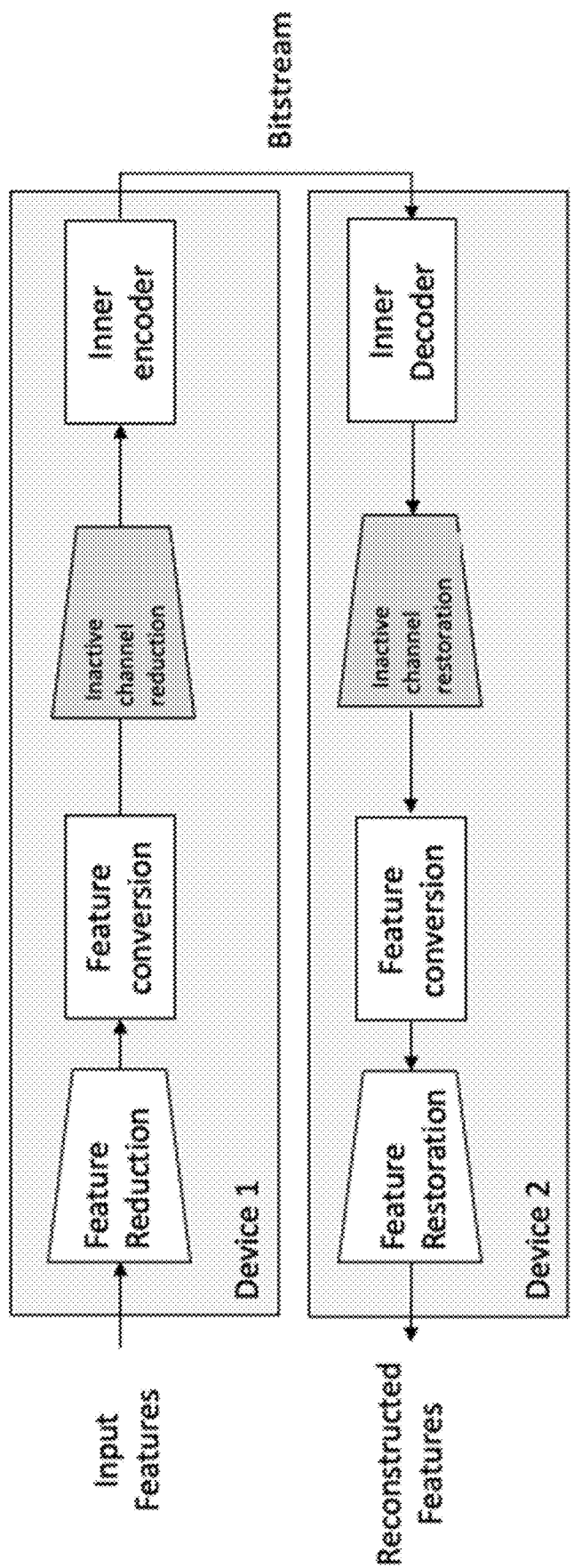
FIG. 10 illustrates an example of inactive channel reduction performed on reduced feature tensors.

FIG. 10 illustrates an example of inactive channel reduction performed on reduced feature tensors. FIG. 10 shows the overall framework of the range-based inactive channel reduction, which may include an "Inactive Channel Reduction" module at the encoder and "Inactive Channel Restoration" at the decoder. In examples, restoration may begin after the decoder, but the exact position of these systems can change (e.g., the system may be implemented pre-feature conversion). The channel reduction may be applied to the converted reduced features. The channel reduction may remove the channel(s) considered inactive that are outputted from the feature reduction stage. This reduction may increase task network performance via noise reduction and may reduce the bitrate by truncating channel and pixel information.

Figure 11:
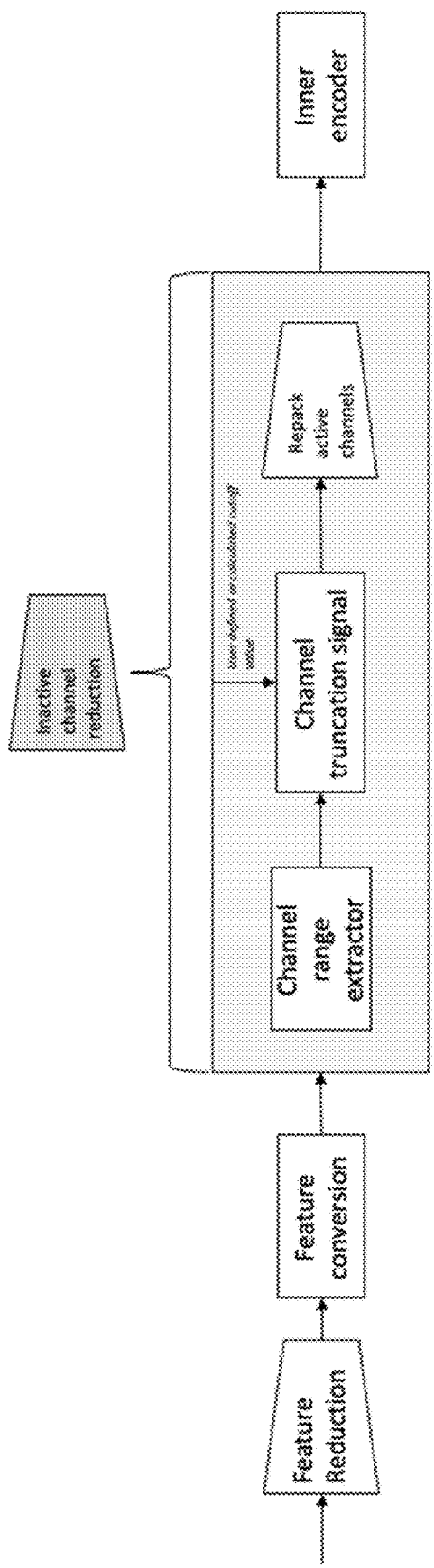
FIG. 11 illustrates an example of the encoder layout for inactive channel reduction.

FIG. 11 illustrates an example of the encoder layout for inactive channel reduction. As shown in FIG. 11, the inactive channel reduction block may include three main stages: channel range extraction; channel truncation signaling; and repacking.

In examples, the encoder may determine whether a channel is active or inactive. The encoder may perform channel reduction based on the determination that the channel is inactive. A feature tensor may be encoded based on the reduced channel. The encoder may include a channel activation indication associated with the channel configured to indicate whether the channel is inactive in video data. In examples, the encoder may determine to change a channel activation status of at least one channel associated with the feature tensor. An indication to update a channel status may be included in video data. The indications to update the channel status and the channel activation may be sent in a supplemental enhancement information (SEI) message. In examples, the encoder may determine a channel range associated with the channel. Based on the channel range of the channel being below a value, the encoder may determine that the channel (e.g., a first channel) is inactive. Based on the channel being determined as inactive, the encoder may perform channel reduction. Channel reduction may be performed by performing at least one of: removing the channel, scaling down the channel, truncating the channel, or filling the channel with a mean value (e.g., associated with a picture). Based on the channel range of the channel being above a value, the encoder may determine that the channel (e.g., a second channel) is active. Based on the determination that the channel (e.g., second channel) is active, the channel may be repacked. The feature tensor may be decoded based on the repacked channel.

In examples, in the channel range extraction stage, the inactive channel reduction may include identifying inactive channels using their absolute range. Channels with a low range may be less activated compared to other channels, meaning channels with a low range may have a lower impact on task performance. Channels with a low range may include small noisy activations, which may negatively impact task network results.

In examples, in the channel truncation signaling stage (e.g., after the channel ranges have been identified), channel activation indications (e.g., removal flags) may be placed on each channel (e.g., channel_active_flag equal to 1 when the channel is transmitted or equal to 0 when it is removed). Channels may be reduced based on thresholding, which may be calculated either by static calculations such as a user defined threshold or dynamic calculations such as percentage of total range. Both the static and dynamic calculations may be used to remove channels with a low absolute range.

Figure 12:
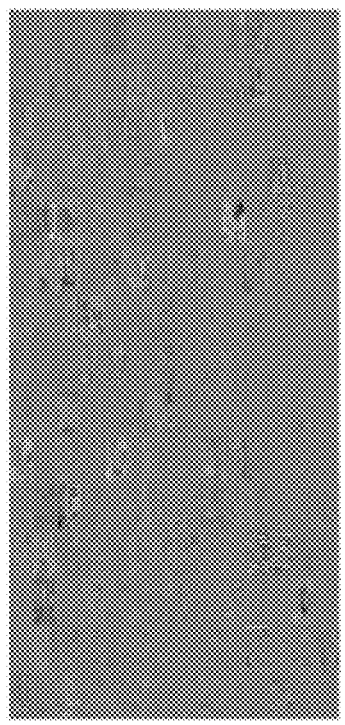
FIG. 12 illustrates an example visualization of feature maps post-processing by the encoder.
Figure 12:
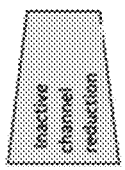
Figure 12:
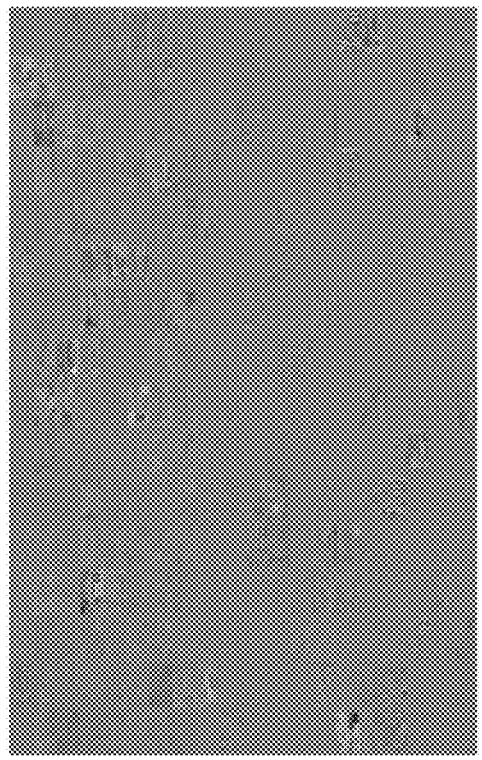

FIG. 12 illustrates an example visualization of feature maps post-processing by the encoder. The initial set of feature maps (or channels) may be output from the FCM current reduction stage, which may (e.g., may then) be reduced by the inactive channel reduction procedures. In examples, in the repacking stage, repacking may pack channels into the final frame that include active signals (e.g., as determined by processes used in the channel reduction stage). In some examples, only active channels are packed into the final frame. In example encoder configurations, the frame size may be maintained via packing within the frame dimensions. In examples, channels may be packed (e.g., packed differently) based on the number of channels outputted (e.g., reduced number of channels outputted).

Figure 13:
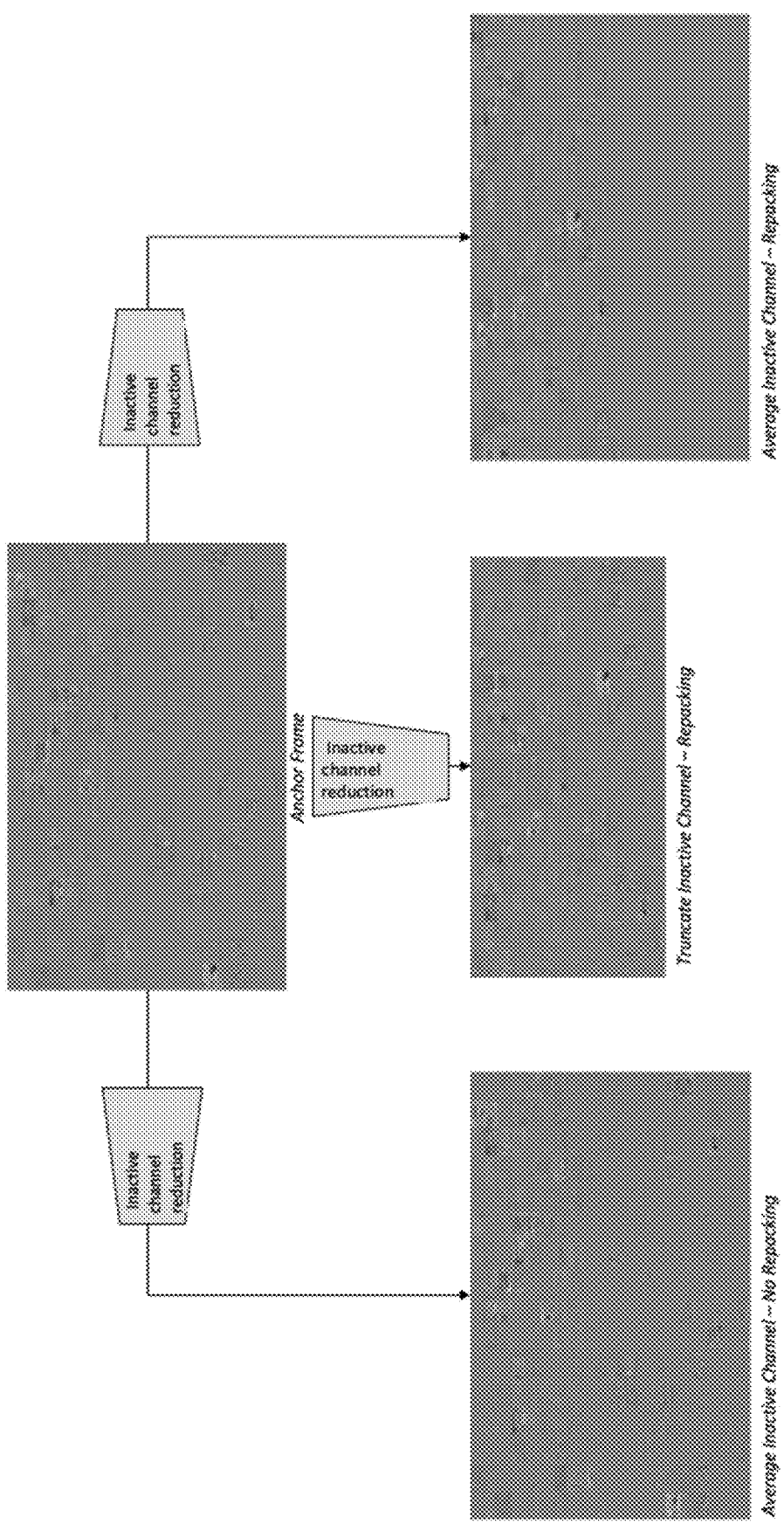
FIG. 13 illustrates example ways to reduce the inactive channel.

FIG. 13 illustrates example ways to reduce the inactive channel. The reduction may reduce the compressed bits and improve overall task performance. If a channel is signaled as inactive, it may be removed (e.g., average removed), may be scaled down, may be truncated, may be filled with a mean value associated with the picture, or any process may be used to reduce the bitrate and/or impact on the task network. A repacking approach may be used. Other processes may be used to reduce the number of inactive channels. In examples, the resolution may be changed during repacking at a key frame and may (e.g., may then) be dynamically adjusted via padding (e.g., in subsequent frames), which may lead to consistent resolution across consecutive sets of packed channel images (e.g., if needed).

Figure 14:
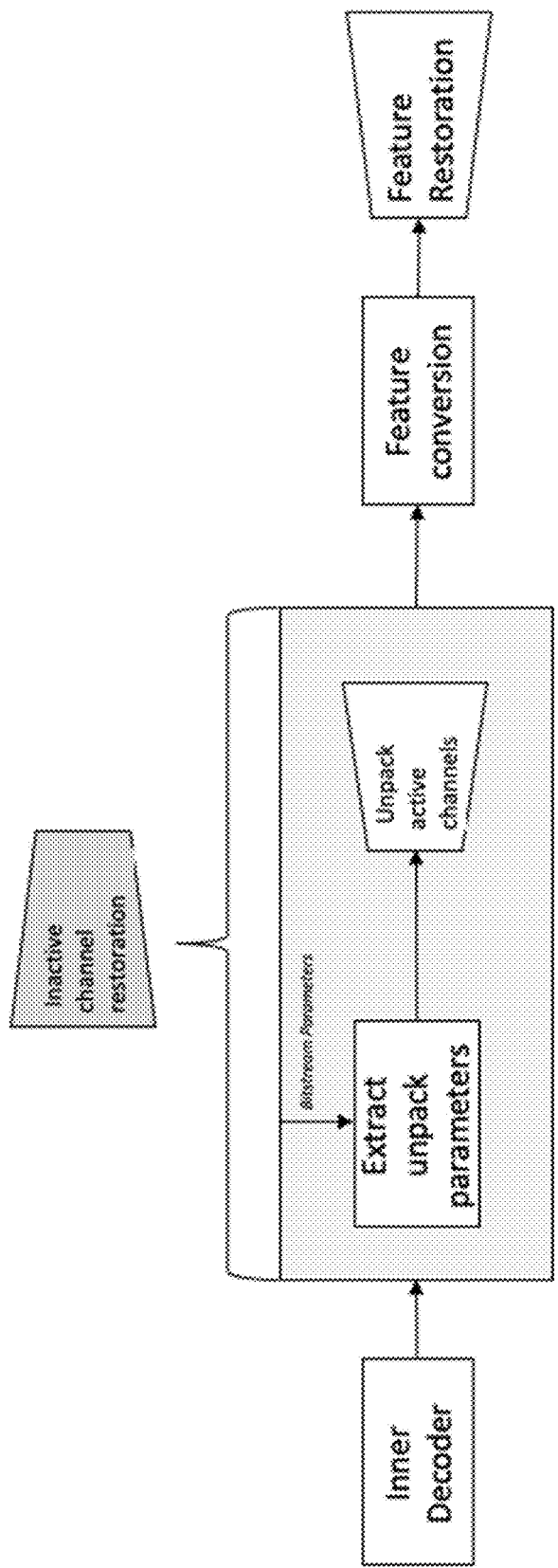
FIG. 14 illustrates an example of the decoder layout for inactive channel reduction.

FIG. 14 illustrates an example of the decoder layout for inactive channel reduction. The decoder process (e.g., as shown in FIG. 14) may return the repacked channels to the state that can be handled by the rest of the decoder system to be compatible with the task network.

In examples, the decoder may obtain a channel activation indication associated with a channel. Based on the channel activation indication associated with the channel, the decoder may determine whether the channel is active or inactive. A feature tensor may be decoded based on the determination of whether the channel is active or inactive. In examples, the decoder may obtain an indication to update a channel activation status. The channel activation indication may be obtained based on the indication indicating to update the channel status. The indication to update the channel status and the channel activation indication may be obtained in a supplemental enhancement information (SEI) message. Based on the determination that the channel is active, the channel may be unpacked. The feature tensor may be decoded based on the unpacked channel. Based on the determination that the channel is inactive, the channel may be padded with a mean value (e.g., associated with a picture). The feature tensor may be decoded based on the padded channel. In examples, the feature tensor may be associated with a plurality of channels that comprises the channel. The decoder may identify a plurality of active channels associated with the feature tensor, may identify at least one inactive channel associated with the feature tensor, may unpack the plurality of active channels, and may reconstruct the feature tensor based on the plurality of unpacked active channels and the at least one inactive channel.

Parameters for unpacking may be extracted and may be used to pack active channels (e.g., alongside decoder generated inactive channels). This may be done to format the output for compatibility with feature conversion and restoration. Examples of proposed syntax to convey the parameters for unpacking are shown in Table 1 below:

TABLE 1

Proposed Syntax to Convey Parameters for Unpacking

| | Descriptor |
|---|---|
| ft_channel_removal_params( ){ | |
|   ft_channel_removal_flag | b(1) |
|   packing_enabled | b(1) |
|   fsps_channel_removal_refresh_period | u(8) |
|   for(i=0, i<num_channels, i++){ | |
|     channel_active[i] | b(1) |
|   } | |
| } | |

The indication to update a channel activation status (e.g., ft_channel_removal_flag indication: bool flag (1 bit)) may denote system activation. The packing-enabled indication (e.g., bool flag (1 bit)) may denote packing system activation. The fsps_channel_removal_refresh_period indication (e.g., integer (8 bit)) may denote a period where packing or frame locking may be refreshed. The channel activation indication (e.g., channel_active[num_channels]: array include 1 bit flag per channel) may denote the activation of that channel for decoder unpacking and decoder removed channel substitution.

The FCM high level syntax structure may include different parameter sets like video codecs (e.g. video parameter set, sequence parameter set, picture parameter set etc.) which may be valid for their respective scope. The following text in Table 2 below may correspond to an exemplary implementation of the proposed process at the sequence level. At the sequence level, the tool may be activated using an indication to update a channel activation status (e.g., the feature_channel_removal_flag). The initial number of feature channels after reduction may be indicated, for instance with a syntax element num_fused_feat_channels as shown in Table 2. Note that it may (e.g., may also) be inferred from the characteristics of the feature reduction/restoration model used.

TABLE 2

Feature Sequence Parameter Set (FSPS)

| | Descriptor |
|---|---|
| feat_seq_parameter_set_rbsp ( ) { | |
|   fsps_feat_seq_parameter_set_id | |
|   num_ori_feat_layers | |
|   for (i = 0; i <= num_feature_layers; i++) { | |
|     ori_feat_wid[i] | |
|     ori_feat_hei[i] | |
|     num_ori_feat_chan[i] | |
|   } | |
|   fused_feat_wid | |
|   fused_feat_hei | |
|   num_fused_feat_channels | u(16) |
|   inner_decoding_bypass_flag | |
|   if( !inner_decoding_bypass_flag ) { | |
|     feat_inner_decoder_info( ) | |
|   } | |
|   fsps_feature_channel_removal_flag | b(1) |
|   fsps_channel_removal_refresh_period | u(8) |
|   dequant_bypass_flag | |
|   unpacking_bypass_flag | |
|   feat_restoration_bypass_flag | |
|   if( !feat_restoration_bypass_flag ) | |
|     feat_restoration_info( ) | |
|   } | |
| } | |

The following text in Table 3 below may correspond to an exemplary implementation of the proposed process at the picture level. At the picture level, an indication to update a channel activation status (e.g., channel_removal_update_flag) may be used to indicate whether or not the active channels need to be updated, or if the previously decoded information may hold for the current frame.

TABLE 3

Feature Picture Parameter Set (FPPS)

| | Descriptor |
|---|---|
| feature_pic_parameter_set_rbsp( ) { | |
|   fpps_feat_pic_parameter_set_id | |
|   fpps_feat_seq_parameter_set_id | |
|   if(!dequant_bypass_flag) { | |
|     packed_feat_val_max | |
|     packed_feat_val_min | |
|   } | |
|   if (fsps_feature_channel_removal_flag) { | |
|     channel_removal_update_flag | b(1) |
|     if (channel_removal_update_flag){ | |
|       for(i=0, i<num_fused_feat_channels, i++){ | |
|         channel_active[i] | b(1) |
|       } | |
|     } | |
|   } | |
| } | |

During a same captured video sequence, the stream of input features to the codec may require involving a different number of active channels.

In examples, the repacking of the first group of pictures sharing the same repacking parameters may either keep a video surface that can include all the input channels, or at least a large number to account for subsequent sets of frames that might require more active channels that the first. The last, unused, channels in the different set of frames may be padded with a mean value associated with the picture, or with any pattern that may reduce the coding cost of this unused surface after the unpacking at the decoder.

In examples, the FCM codec may produce different video bitstreams foreach group of subsequent frames that may share a repacking of the same number of active channels. If a different number of active channels is found during the sequence, a new video bitstream with a different frame resolution may be created. This may have a slight overhead in terms of bitrate, as extra high-level syntax parameters may be transmitted (e.g., a video parameter set and a sequence parameter set may be transmitted) at the start of each bitstream. However, it is flexible and may lead to efficient decoding as a receiver device may instantiate multiple decoders and parallelize decoding or may smartly schedule the start of the decoding of the next bitstream.

An FCM bitstream may be composed of a video bitstream and side information indicating the different parameters that may be used by the feature conversion and restoration processes. The FCM may use a dedicated SEI message. An SEI message may be attached to video pictures and have a persistence mechanism that makes them valid for subsequent frames in output order, until a new SEI message is available.

TABLE 4

Supplemental Enhancement Information Message
Table 4 as shown below may edit the current SEI message.

| | Descriptor |
|---|---|
| fcm_decoder_info( payloadSize ) { | |
|   fcm_decoder_info_sei_id | ue(v) |
|   set_level_flag | u(1) |
|   if( set_level_flag ) | |
|     fcm_level | u(8) |
|   update_decoder_flag | u(1) |
|   num_fused_feat_channels | u(16) |
|   channel_removal_flag | b(1) |
|   if( channel_removal_flag ) { | |
|     for(i=0, i<num_channels, i++){ | |
|       channel_active[i] | b(1) |
|     } | |
|   } | |
|   if( update_decoder_flag ) { | |
|     no_weights_flag | u(1) |
|     nnfr_mode_idc | u(6) |
|     if( nnfr_mode_idc == 1 ) { | |
|       /* ISO/IEC 15938-17 bitstream */ | |
|       while( !byte_aligned( ) ) | |
|         nnfr_alignment_zero_bit_a | u(1) |
|       for( i = 0; more_data_in_payload( ); i++ ) | |
|         nnfr_payload_byte[ i ] | b(8) |
|     } | |
|     if( nnfr_mode_idc == 2 ) { | |
|       while( !byte_aligned( ) ) | |
|         nnfr_alignment_zero_bit_b | u(1) |
|       nnfr_tag_uri | st(v) |
|       nnfr_uri | st(v) |
|     } | |
|     if( nnfr_mode_idc == 3 ) { | |
|       explicit_decoder_compression_idc | u(2) |
|       explicit_decoder_format_idc | u(4) |
|       explicit_decoder_format_version_idc | ue(v) |
|       explicit_decoder_payload_len | ue(v) |
|       for( i = 0; i < explicit_decoder_payload_len; i ++ ) | |
|         decoder_payload[ i ] | u(8) |
|       register_decoder_idc_flag | u(1) |
|       if( register_decoder_idc_flag ) | |
|         decoder_idc | ue(v) |
|     } else { | |
|       registered_decoder_idc | UTF-8 string |
|     } | |
|   } | |
|   if( !no_weights_flag ) { | |
|     update_weights_flag | u(1) |
|     if( update_weights_flag ) { | |
|       explicit_signal_weights_flag | u(1) |
|       if( explicit_signal_weights_flag ) { | |
|         explicit_weights_idc | ue(v) |
|         explicit_weights_payload_len | ue(v) |
|         for( i = 0; i < explicit_weights_payload_len; i++ ) | |
|           weights_payload[ i ] | u(8) |
|       } | |
|     } | |
|   } | |
| } | |

Although features and elements are described above in particular combinations, one of ordinary skill in the art will appreciate that each feature or element can be used alone or in any combination with the other features and elements. In addition, the methods described herein may be implemented in a computer program, software, or firmware incorporated in a computer-readable medium for execution by a computer or processor. Examples of computer-readable media include electronic signals (transmitted over wired or wireless connections) and computer-readable storage media. Examples of computer-readable storage media include, but are not limited to, a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs). A processor in association with software may be used to implement a radio frequency transceiver for use in a WTRU, UE, terminal, base station, RNC, or any host computer.

What is claimed:

1. A device for video decoding, comprising:
a processor configured to:
obtain a channel activation indication associated with a channel;
based on the channel activation indication associated with the channel, determine whether the channel is active or inactive; and
decode a feature tensor based on the determination of whether the channel is active or inactive.

2. The device of claim 1, wherein the processor is further configured to:
based on the determination that the channel is active, unpack the channel, wherein the feature tensor is decoded based on the unpacked channel.

3. The device of claim 1, wherein the processor is further configured to:
based on the determination that the channel is inactive, pad the channel with a mean value associated with a picture, wherein the feature tensor is decoded based on the padded channel.

4. The device of claim 1, wherein the processor is further configured to:
obtain an indication to update a channel activation status, wherein the channel activation indication is obtained based on the indication indicating to update the channel status.

5. The device of claim 4, wherein the indication to update the channel status and the channel activation indication are obtained in a supplemental enhancement information (SEI) message.

6. The device of claim 1, wherein the feature tensor is associated with a plurality of channels that comprises the channel, and the processor is further configured to:
identify a plurality of active channels associated with the feature tensor;
identify at least one inactive channel associated with the feature tensor;
unpack the plurality of active channels; and
reconstruct the feature tensor based on the plurality of unpacked active channels and the at least one inactive channel.

7. The device of claim 1, wherein the channel is a channel associated with a feature map.

8. A method for video decoding, the method comprising:
obtaining a channel activation indication associated with a channel;
based on the channel activation indication associated with the channel, determining whether the channel is active or inactive; and
decoding a feature tensor based on the determination of whether the channel is active or inactive.

9. The method of claim 8, further comprising:
based on the determination that the channel is active, unpacking the channel, wherein the feature tensor is decoded based on the unpacked channel.

10. The method of claim 8, further comprising:
based on the determination that the channel is inactive, padding the channel with a mean value associated with a picture, wherein the feature tensor is decoded based on the padded channel.

11. The method of claim 8, further comprising:
obtaining an indication to update a channel activation status, wherein the channel activation indication is obtained based on the indication indicating to update the channel status.

12. The method of claim 11, wherein the indication to update the channel status and the channel activation indication are obtained in a supplemental enhancement information (SEI) message.

13. The method of claim 8, wherein the feature tensor is associated with a plurality of channels that comprises the channel, further comprising:
identifying a plurality of active channels associated with the feature tensor;
identifying at least one inactive channel associated with the feature tensor;
unpacking the plurality of active channels; and
reconstructing the feature tensor based on the plurality of unpacked active channels and the at least one inactive channel.

14. A device for video encoding, comprising:
a processor configured to:
determine whether a channel is active or inactive;
perform channel reduction based on the determination that the channel is inactive; and
encode a feature tensor based on the reduced channel.

15. The device of claim 14, wherein the processor is further configured to:
include a channel activation indication associated with the channel configured to indicate whether the channel is inactive in video data.

16. The device of claim 15, wherein the processor is further configured to:
determine to change a channel activation status of at least one channel associated with the feature tensor; and
include an indication to update a channel status in video data.

17. The device of claim 16, wherein the indication to update the channel status and the channel activation indication are sent in a supplemental enhancement information (SEI) message.

18. The device of claim 14, wherein the processor is further configured to:
determine a channel range associated with the channel; and
based on the channel range of the channel being below a value, determine that the channel is inactive.

19. The device of claim 18, wherein performing channel reduction further comprises at least one of:
removing the channel;
scaling down the channel;
truncating the channel; or
filling the channel with a mean value.

20. The device of claim 14, wherein the channel is a first channel associated with the feature tensor, the processor is further configured to:
determine that a channel range of a second channel associated with the feature tensor is above a threshold; and
based on the channel range of the second channel being above the threshold, determine that the second channel is active;
based on the determination that the second channel is active, repack the second channel, wherein the feature tensor is decoded based on the repacked second channel.

* * * * *